US011085663B2

(12) United States Patent
Ellis et al.

(10) Patent No.: US 11,085,663 B2
(45) Date of Patent: Aug. 10, 2021

(54) BUILDING MANAGEMENT SYSTEM WITH TRIGGERED FEEDBACK SET-POINT SIGNAL FOR PERSISTENT EXCITATION

(71) Applicant: Johnson Controls Technology Company, Auburn Hills, MI (US)

(72) Inventors: Matthew J. Ellis, Milwaukee, WI (US); Anas W. I. Alanqar, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/516,928

(22) Filed: Jul. 19, 2019

(65) Prior Publication Data
US 2021/0018209 A1 Jan. 21, 2021

(51) Int. Cl.
*F24F 11/65* (2018.01)
*G05B 13/04* (2006.01)
*F24F 11/46* (2018.01)
*F24F 11/59* (2018.01)

(52) U.S. Cl.
CPC .............. *F24F 11/65* (2018.01); *F24F 11/46* (2018.01); *F24F 11/59* (2018.01); *G05B 13/041* (2013.01)

(58) Field of Classification Search
CPC . F24F 11/65; F24F 11/46; F24F 11/59; G05B 13/041
See application file for complete search history.

(56) References Cited

U.S. PATENT DOCUMENTS

| 4,707,324 | A | 11/1987 | Storrick |
| 6,405,554 | B1 | 6/2002 | Kawakatu et al. |
| 6,468,814 | B1 | 10/2002 | Frees et al. |
| 8,200,345 | B2 * | 6/2012 | Li .................... F24F 11/30 700/38 |
| 8,694,132 | B2 | 4/2014 | Li et al. |

(Continued)

FOREIGN PATENT DOCUMENTS

JP 2012-141110 A 7/2012

OTHER PUBLICATIONS

U.S. Appl. No. 15/900,459, filed Feb. 20, 2018, Alanqar et al.
(Continued)

*Primary Examiner* — Chad G Erdman
(74) *Attorney, Agent, or Firm* — Foley & Lardner LLP

(57) ABSTRACT

An environmental control system for a building including heating, ventilation, or air conditioning (HVAC) equipment that operates to affect a temperature of a zone of the building. The system includes a temperature sensor to measure the temperature and a controller including a processing circuit. The processing circuit is configured to operate the HVAC equipment based on a temperature setpoint and gather training data indicating system dynamics. The processing circuit is configured to monitor a temperature tracking error of the zone and a heat transfer value of the HVAC equipment and determine if the HVAC equipment is in a saturation region based on the temperature tracking error and the heat transfer value. The processing circuit is configured to, in response to a determination that the HVAC equipment is in the saturation region, calculate an adjusted temperature setpoint and operate the HVAC equipment based on the adjusted temperature setpoint.

20 Claims, 23 Drawing Sheets

(56) References Cited

U.S. PATENT DOCUMENTS

| | | | |
|---|---|---|---|
| 8,903,554 | B2 | 12/2014 | Stagner |
| 9,235,657 | B1 | 1/2016 | Wenzel et al. |
| 10,767,886 | B2 * | 9/2020 | Alanqar .................. F24F 11/63 |
| 2004/0168450 | A1 | 9/2004 | Nishiwaki |
| 2004/0248589 | A1 | 12/2004 | Gwon et al. |
| 2011/0214020 | A1 | 9/2011 | Caspi et al. |
| 2013/0338935 | A1 | 12/2013 | Watanabe et al. |
| 2014/0260379 | A1 * | 9/2014 | Marte ..................... F25B 49/02 62/115 |
| 2014/0331700 | A1 * | 11/2014 | Madsen .................. F25B 39/04 62/115 |
| 2015/0274346 | A1 | 10/2015 | Buckby et al. |
| 2015/0316907 | A1 | 11/2015 | Elbsat et al. |
| 2016/0098022 | A1 | 4/2016 | Wenzel et al. |
| 2016/0305678 | A1 | 10/2016 | Pavlovski et al. |
| 2018/0285800 | A1 | 10/2018 | Wenzel et al. |

OTHER PUBLICATIONS

U.S. Appl. No. 16/240,028, filed Jan. 4, 2019, Alanqar et al.
U.S. Appl. No. 16/418,715, filed May 21, 2019, Alanqar et al.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Batterman, Stuart. Review and Extension of CO2-Based Methods to Determine Ventilation Rates with Application to School Classrooms. International Journal of Environmental Research and Public Health. Feb. 4, 2017. 22 Pages.
Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 4-7 and 13-15. 183 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kang et al., Novel Modeling and Control Strategies for a HVAC System Including Carbon Dioxide Control. Jun. 2, 2014. 19 Pages.
Kelman and F. Borrelli. Bilinear Model Predictive Control of a HVAC System Using Sequential Quadratic Programming. In Proceedings of the 2011 IFAC World Congress, 2011, 6 pages.
Lampinen, Markku J. Thermodynamics of Humid Air. Sep. 2015. 39 Pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Ljung, L. (1999). System Identification: Theory for the User, 2nd ed. (Prentice Hall PTR, Upper Saddle River).
Luo, Xiaoyan. Maximizing Thermal Comfort and International Design. Loughborough University. Jan. 18, 2019. 4 Pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages. 2018.
Pannocchia, G. & Rawlings, J.B. (2003) Disturbance Models for Offset-Free Model-Predictive Control. AIChE Journal, 49,426-437.
Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Sudhakaran, Saurabh; Shaurette Mark. Temperature, Relative Humidity, and CarbonDioxide Modulation in a Near-Zero Energy Efficient Retrofit House. Purdue University. 2016, 11 Pages.
Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

* cited by examiner

BUILDING MANAGEMENT SYSTEM WITH TRIGGERED FEEDBACK SET-POINT SIGNAL FOR PERSISTENT EXCITATION

BACKGROUND

The present disclosure relates generally to control systems for buildings. The present disclosure relates more particularly to controlling building equipment to generate accurate models through system identification.

System identification refers to a determination of a model that describes a system. For example, system identification may be used to identify a system describing environmental conditions. Because the physical phenomena that govern such systems are often complex, nonlinear, and poorly understood, system identification requires the determination of model parameters based on measured and recorded data from the real system in order to generate an accurate predictive model. However, actuator saturation, a common problem in control systems, can jeopardize quality of the data, thereby leading to predictive models that do not reflect true system dynamics. If left uncontrolled, actuator saturation can lead to inaccurate predictive models that erode accuracy of control decisions.

SUMMARY

One implementation of the present disclosure is an environmental control system for a building, according to some embodiments. The system includes heating, ventilation, or air conditioning (HVAC) equipment that operates to affect a temperature of a zone of the building, according to some embodiments. The system includes a temperature sensor to measure the temperature of the zone, according to some embodiments. The system includes a controller including a processing circuit, according to some embodiments. The processing circuit is configured to operate the HVAC equipment based on a temperature setpoint, according to some embodiments. The processing circuit is configured to gather training data indicating one or more system dynamics, according to some embodiments. The processing circuit is configured to monitor a temperature tracking error of the zone and a heat transfer value of the HVAC equipment, according to some embodiments. The processing circuit is configured to determine if the HVAC equipment is in a saturation region based on the temperature tracking error and the heat transfer value, according to some embodiments. The processing circuit is configured to, in response to a determination that the HVAC equipment is in the saturation region, calculate an adjusted temperature setpoint, according to some embodiments. The processing circuit is configured to operate the HVAC equipment based on the adjusted temperature setpoint, according to some embodiments.

In some embodiments, the processing circuit is configured to, in response to operating the HVAC equipment based on the adjusted temperature setpoint, determine if an additional setpoint adjustment is necessary to drive the HVAC equipment out of the saturation region. The processing circuit is configured to, in response to a determination that the additional setpoint adjustment is necessary, calculate a new value of the adjusted temperature setpoint and operate the HVAC equipment based on the new value of the adjusted temperature setpoint, according to some embodiments.

In some embodiments, the system includes a user interface. The processing circuit is configured to receive a temperature adjustment from the user interface, according to some embodiments. The processing circuit is configured to determine a temperature constraint based on the temperature adjustment, according to some embodiments. The temperature setpoint adheres to the temperature constraint, according to some embodiments.

In some embodiments, the processing circuit is configured to generate a predictive model based on the training data to predict the one or more system dynamics. The processing circuit is configured to perform an optimization based on the predictive model to determine an operating setpoint of the HVAC equipment, according to some embodiments.

In some embodiments, the one or more system dynamics include at least one of: temperature dynamics of the zone, building mass temperature dynamics of the building, or heat transfer dynamics of the HVAC equipment.

In some embodiments, the processing circuit is configured to determine if the HVAC equipment is in the saturation region by determining whether the temperature tracking error exceeds a threshold value for a predetermined period of time. The processing circuit is configured to determine if the HVAC equipment is in the saturation region by determining whether the HVAC equipment is operating in a low range around a minimum load or is operating in a high range around a maximum load for the predetermined period of time, according to some embodiments.

In some embodiments, the temperature setpoint is determined based on a pseudorandom binary signal or a random Gaussian signal.

Another implementation of the present disclosure is a method for exciting system dynamics of a building, according to some embodiments. The method includes operating heating, ventilation, or air conditioning (HVAC) equipment based on a temperature setpoint to affect a temperature of a zone of the building, according to some embodiments. The method includes gathering training data indicating one or more system dynamics, according to some embodiments. The method includes monitoring a temperature tracking error of the zone and a heat transfer value of the HVAC equipment, according to some embodiments. The method includes determining if the HVAC equipment is in a saturation region based on the temperature tracking error and the heat transfer value, according to some embodiments. The method includes, in response to a determination that the HVAC equipment is in the saturation region, calculating an adjusted temperature setpoint, according to some embodiments. The method includes operating the HVAC equipment based on the adjusted temperature setpoint, according to some embodiments.

In some embodiments, the method includes, in response to operating the HVAC equipment based on the adjusted temperature setpoint, determining if an additional setpoint adjustment is necessary to drive the HVAC equipment out of the saturation region. The method includes, in response to a determination that the additional setpoint adjustment is necessary, calculating a new value of the adjusted temperature setpoint and operate the HVAC equipment based on the new value of the adjusted temperature setpoint, according to some embodiments.

In some embodiments, the method includes receiving a temperature adjustment. The method includes determining a temperature constraint based on the temperature adjustment, according to some embodiments. The temperature setpoint adheres to the temperature constraint, according to some embodiments.

In some embodiments, the method includes generating a predictive model based on the training data to predict the one or more system dynamics. The method includes performing an optimization based on the predictive model to determine an operating setpoint of the HVAC equipment, according to some embodiments.

In some embodiments, the one or more system dynamics include at least one of:
temperature dynamics of the zone, building mass temperature dynamics of the building, or heat transfer dynamics of the HVAC equipment.

In some embodiments, determining if the HVAC equipment is in the saturation region includes determining whether the temperature tracking error exceeds a threshold value for a predetermined period of time. Determining if the HVAC equipment is in the saturation region includes determining whether the HVAC equipment is operating in a low range around a minimum load or is operating in a high range around a maximum load for the predetermined period of time, according to some embodiments.

Another implementation of the present disclosure is a controller for operating for operating heating, ventilation, or air conditioning (HVAC) equipment of a building, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include operating the HVAC equipment based on a temperature setpoint to affect a temperature of a zone of the building, according to some embodiments. The operations include gathering training data indicating one or more system dynamics, according to some embodiments. The operations include monitoring a temperature tracking error of the zone and a heat transfer value of the HVAC equipment, according to some embodiments. The operations include determining if the HVAC equipment is in a saturation region based on the temperature tracking error and the heat transfer value, according to some embodiments. The operations include, in response to a determination that the HVAC equipment is in the saturation region, calculating an adjusted temperature setpoint, according to some embodiments. The operations include operating the HVAC equipment based on the adjusted temperature setpoint, according to some embodiments.

In some embodiments, the operations include, in response to operating the HVAC equipment based on the adjusted temperature setpoint, determining if an additional setpoint adjustment is necessary to drive the HVAC equipment out of the saturation region. The operations include, in response to a determination that the additional setpoint adjustment is necessary, calculating a new value of the adjusted temperature setpoint and operate the HVAC equipment based on the new value of the adjusted temperature setpoint, according to some embodiments.

In some embodiments, the operations include receiving a temperature adjustment. The operations include determining a temperature constraint based on the temperature adjustment, according to some embodiments. The temperature setpoint adheres to the temperature constraint, according to some embodiments.

In some embodiments, the operations include generating a predictive model based on the training data to predict the one or more system dynamics. The operations include performing an optimization based on the predictive model to determine an operating setpoint of the HVAC equipment, according to some embodiments.

In some embodiments, the one or more system dynamics include at least one of: temperature dynamics of the zone, building mass temperature dynamics of the building, or heat transfer dynamics of the HVAC equipment.

In some embodiments, determining if the HVAC equipment is in the saturation region includes determining whether the temperature tracking error exceeds a threshold value for a predetermined period of time. Determining if the HVAC equipment is in the saturation region includes determining whether the HVAC equipment is operating in a low range around a minimum load or is operating in a high range around a maximum load for the predetermined period of time, according to some embodiments.

In some embodiments, the temperature setpoint is determined based on a pseudorandom binary signal or a random Gaussian signal.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for commanding setpoints that maintain a temperature of a zone to generate data that accurately reflects system dynamics through persistent excitation of an HVAC system are shown and described. The systems and methods described herein can be used to limit actuator saturation and thereby generate data representative of system dynamics for use in system identification to generate a predictive model. By controlling actuator saturation, the predictive model generated through system identification can be used to in various control applications such as model predictive control (MPC) to determine control decisions of building equipment that more closely match system dynamics than if actuator saturation is ignored.

As described herein, saturation can refer to a situation in which the HVAC system (and/or HVAC equipment therein) is providing a maximum or a minimum value of heat transfer $\dot{Q}_{HVAC}$. In some embodiments, the minimum value of $\dot{Q}_{HVAC}$ indicates a lowest value of $\dot{Q}_{HVAC}$ that the HVAC system can provide while still in operation (i.e., the HVAC system is not turned off). In some embodiments, the maximum value of HVAC indicates a highest value of $\dot{Q}_{HVAC}$ that the HVAC system can provide. In other words, the maximum value of $\dot{Q}_{HVAC}$ can indicate the HVAC system is performing at maximum capacity. If the HVAC system is operating at either the maximum or the minimum value of $\dot{Q}_{HVAC}$, the HVAC system can be considered to be in saturation conditions.

To avoid saturation conditions in a building, a temperature setpoint of the HVAC system can be adjusted based on feedback from the HVAC system and other environmental conditions such as an indoor temperature. Particularly, the temperature setpoint can be commanded such that a temperature of a zone of building is controlled in order to generate training data that is representative of system dynamics through persistent excitation of HVAC dynamics. By persistently exciting HVAC dynamics, data rich in content can be gathered and used in system identification for generating an accurate predictive model. These and other features of the systems and methods are described in detail below.

Building HVAC Systems

Figure 1:
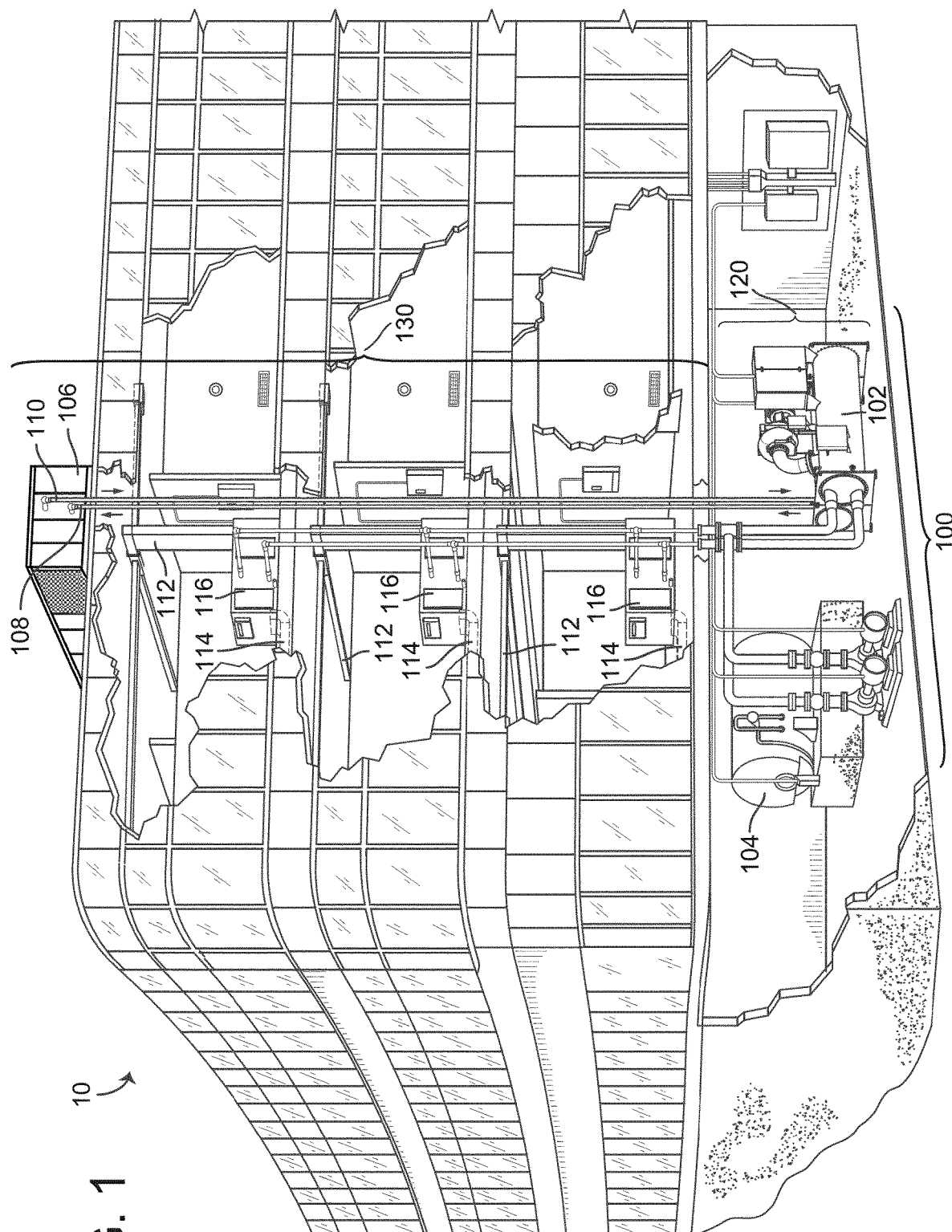
FIG. 1 is a drawing of a building equipped with a HVAC system, according to some embodiments.

Referring to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

HVAC system 100 thereby provides heating and cooling to the building 10. The building 10 also includes other sources of heat transfer that the indoor air temperature in the building 10. The building mass (e.g., walls, floors, furniture) influences the indoor air temperature in building 10 by storing or transferring heat (e.g., if the indoor air temperature is less than the temperature of the building mass, heat transfers from the building mass to the indoor air). People, electronic devices, other appliances, etc. ("heat load") also contribute heat to the building 10 through body heat, electrical resistance, etc. Additionally, the outside air temperature impacts the temperature in the building 10 by providing heat to or drawing heat from the building 10.

HVAC System and Model

Figure 2:
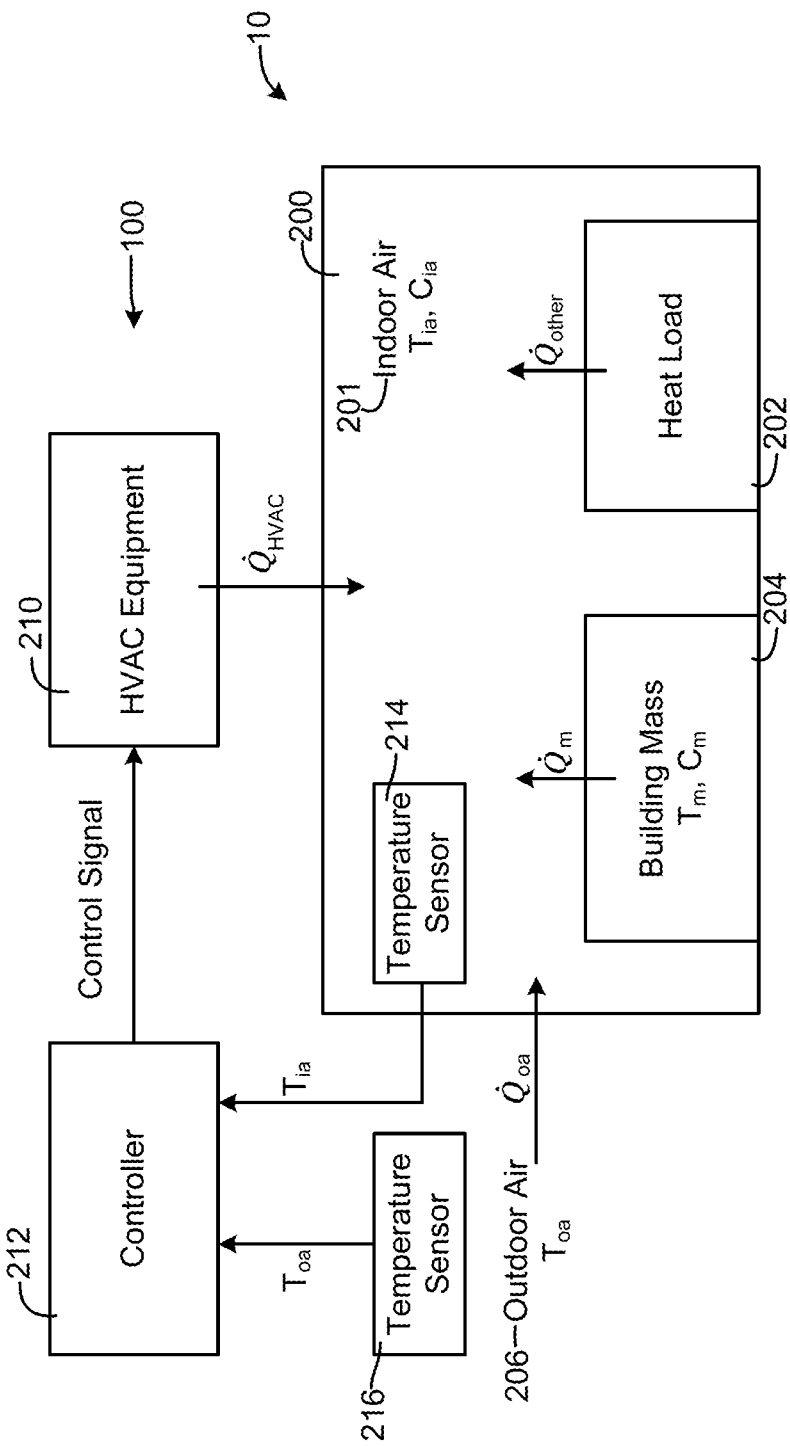
FIG. 2 is a block diagram of the building and HVAC system of FIG. 1, according to some embodiments.

Referring now to FIG. 2, a block diagram of the HVAC system 100 with building 10 is shown, according to an exemplary embodiment. More particularly, FIG. 2 illustrates the variety of heat transfers that affect the indoor air temperature $T_{ia}$ of the indoor air 201 in zone 200 of building 10. Zone 200 is a room, floor, area, etc. of building 10. In general, the primary goal of the HVAC system 100 is to maintain the indoor air temperature $T_{ia}$ in the zone 200 at or around a desired temperature to facilitate the comfort of occupants of the zone 200 or to meet other needs of the zone 200.

As shown in FIG. 2, the indoor air temperature $T_{ia}$ of the zone 200 has a thermal capacitance $C_{ia}$. The indoor air temperature $T_{ia}$ is affected by a variety of heat transfers Q into the zone 200, as described in detail below. It should be understood that although all heat transfers $\dot{Q}$ are shown in FIG. 2 as directed into the zone 200, the value of one or more of the heat transfers $\dot{Q}$ may be negative, such that heat flows out of the zone 200.

The heat load 202 contributes other heat transfer $\dot{Q}_{other}$ to the zone 200. The heat load 202 includes the heat added to the zone by occupants (e.g., people, animals) that give off body heat in the zone 200. The heat load 202 also includes computers, lighting, and other electronic devices in the zone 200 that generate heat through electrical resistance, as well as solar irradiance.

The building mass 204 contributes building mass heat transfer $\dot{Q}_m$ to the zone 200. The building mass 204 includes the physical structures in the building, such as walls, floors, ceilings, furniture, etc., all of which can absorb or give off heat. The building mass 204 has a temperature $T_m$ and a lumped mass thermal capacitance $C_m$. The resistance of the building mass 204 to exchange heat with the indoor air 201 (e.g., due to insulation, thickness/layers of materials, etc.) may be characterized as mass thermal resistance $R_{mi}$.

The outdoor air 206 contributes outside air heat transfer $\dot{Q}_{oa}$ to the zone 200. The outdoor air 206 is the air outside of the building 10 with outdoor air temperature $T_{oa}$. The outdoor air temperature $T_{oa}$ fluctuates with the weather and climate. Barriers between the outdoor air 206 and the indoor air 201 (e.g., walls, closed windows, insulation) create an outdoor-indoor thermal resistance $R_{oi}$ to heat exchange between the outdoor air 206 and the indoor air 201.

The HVAC system 100 also contributes heat to the zone 200, denoted as $\dot{Q}_{HVAC}$. The HVAC system 100 includes HVAC equipment 210, controller 212, an indoor air temperature sensor 214 and an outdoor air temperature sensor 216. The HVAC equipment 210 may include the waterside system 120 and airside system 130 of FIG. 1, or other suitable equipment for controllably supplying heating and/or cooling to the zone 200. In general, HVAC equipment 210 is controlled by a controller 212 to provide heating (e.g., positive value of $\dot{Q}_{HVAC}$) or cooling (e.g., a negative value of $\dot{Q}_{HVAC}$) to the zone 200.

The indoor air temperature sensor 214 is located in the zone 200, measures the indoor air temperature $T_{ia}$, and provides the measurement of $T_{ia}$ to the controller 212. The outdoor air temperature sensor 216 is located outside of the building 10, measures the outdoor air temperature $T_{oa}$, and provides the measurement of $T_{oa}$ to the controller 212.

The controller 212 receives the temperature measurements $T_{oa}$ and $T_{ia}$, generates a control signal for the HVAC equipment 210, and transmits the control signal to the HVAC equipment 210. The operation of the controller 212 is discussed in detail below. In general, the controller 212 considers the effects of the heat load 202, building mass 204, and outdoor air 206 on the indoor air 201 in controlling the HVAC equipment 210 to provide a suitable level of $\dot{Q}_{HVAC}$. A model of this system for use by the controller 212 is described with reference to FIG. 3.

In the embodiments described herein, the control signal provide to the HVAC equipment 210 by the controller 110 indicates a temperature setpoint $T_{sp}$ for the zone 200. To determine the temperature setpoint $T_{sp}$, the controller 212 assumes that the relationship between the indoor air temperature $T_{ia}$ and the temperature setpoint $T_{sp}$ follows a proportional-integral control law with saturation, represented as:

$$\dot{Q}_{HVAC,j} = K_{p,j}\varepsilon_{sp} + K_{I,j}\int_0^t \varepsilon_{sp}(s)ds \quad \text{(Eq. A)}$$

$$\varepsilon_{sp} = T_{sp,j} - T_{ia} \quad \text{(Eq. B)}$$

where $j \in \{clg, hlg\}$ is the index that is used to denote either heating or cooling mode. Different parameters $K_{p,j}$ and $K_{I,j}$ are needed for the heating and cooling mode. Moreover, the heating and cooling load is constrained to the following set: $\dot{Q}_{HVAC,j} \in [0, \dot{Q}_{clg,max}]$ for cooling mode (j=clg) and $\dot{Q}_{HVAC,j} \in [-\dot{Q}_{htg,max}, 0]$ for heating mode (j=htg). As discussed in detail below with reference to FIG. 4, the controller 212 uses this model in generating a control signal for the HVAC equipment 210.

Figure 3:
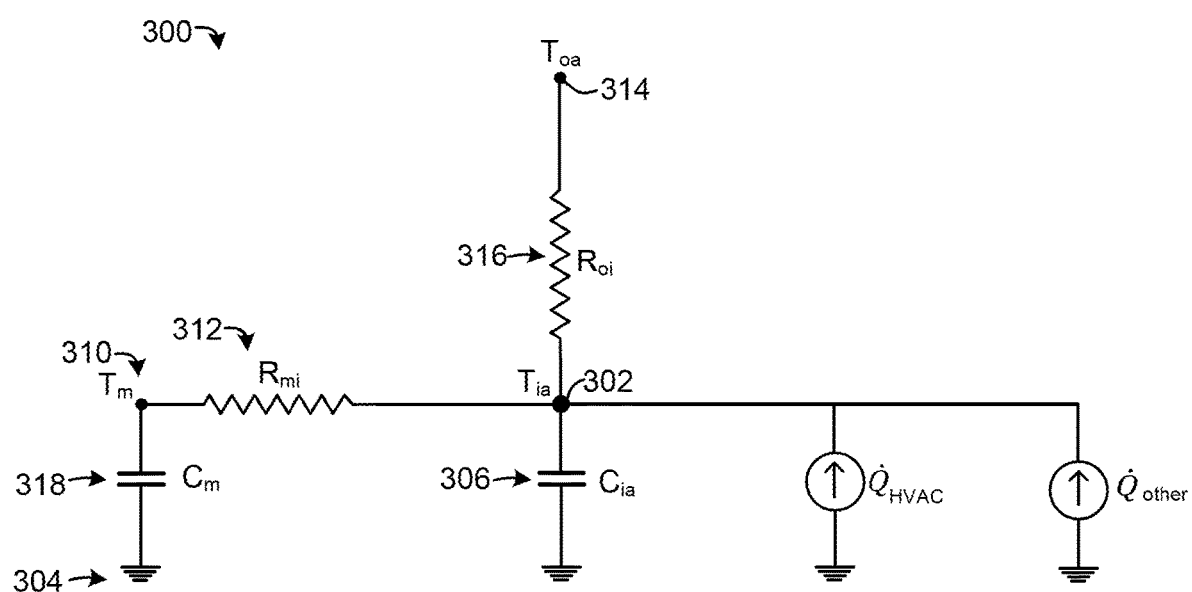
FIG. 3 is a circuit-style diagram of a model of the building and HVAC system of FIG. 1, according to some embodiments.

Referring now to FIG. 3, a circuit-style diagram 300 corresponding to the zone 200 and the various heat transfers Q of FIG. 2 is shown, according to an exemplary embodiment. In general, the diagram 300 models the zone 200 as a two thermal resistance, two thermal capacitance, control-oriented thermal mass system. This model can be characterized by the following system of linear differential equations, described with reference to FIG. 3 below:

$$C_{ia}\dot{T}_{ia} = \frac{1}{R_{mi}}(T_m - T_{ia}) + \frac{1}{R_{oi}}(T_{oa} - T_{ia}) - \dot{Q}_{HVAC} + \dot{Q}_{other} \quad \text{(Eq. C)}$$

$$C_m \dot{T}_m = \frac{1}{R_{mi}}(T_{ia} - T_m) \quad \text{(Eq. D)}$$

where the first line (Eq. C) focuses on the indoor air temperature $T_{ia}$, and each term in Eq. C corresponds to a branch of diagram 300 as explained below:

Indoor air node 302 corresponds to the indoor air temperature $T_{ia}$. From indoor air node 302, the model branches in several directions, including down to a ground 304 via a capacitor 306 with a capacitance $C_{ia}$. The capacitor 306 models the ability of the indoor air to absorb or release heat and is associated with the rate of change of the indoor heat transfer $\dot{T}_{ia}$. Accordingly, the capacitor 306 enters Eq. C on the left side of the equation as $C_{ia}\dot{T}_{ia}$.

From indoor air node 302, the diagram 300 also branches left to building mass node 310, which corresponds to the thermal mass temperature $T_m$. A resistor 312 with mass thermal resistance $R_{mi}$ separates the indoor air node 302 and the building mass node 310, modeling the heat transfer $\dot{Q}_m$ from the building mass 204 to the indoor air 201 as $$\frac{1}{R_{mi}}(T_m - T_{ia}).$$

This term is included on the right side of Eq. C above as contributing to the rate of change of the indoor air temperature $\dot{T}_{ia}$.

The diagram 300 also branches up from indoor air node 302 to outdoor air node 314. A resistor 316 with outdoor-indoor thermal resistance $R_{oi}$ separates the indoor air node 302 and the outdoor air node 314, modeling the flow heat from the outdoor air 206 to the indoor air 201 as $$\frac{1}{R_{oi}}(T_{oa} - T_{ia}).$$

This term is also included on the right side of Eq. C above as contributing to the rate of change of the indoor air temperature $\dot{T}_{ia}$.

Also from indoor air node 302, the diagram 300 branches right to two $\dot{Q}$ sources, namely $\dot{Q}_{HVAC}$ and $\dot{Q}_{other}$. As mentioned above, $\dot{Q}_{other}$ corresponds to heat load 202 and to a variety of sources of energy that contribute to the changes in the indoor air temperature $T_{ia}$. $\dot{Q}_{other}$ is not measured or controlled by the HVAC system 100, yet contributes to the rate of change of the indoor air temperature $\dot{T}_{ia}$. $\dot{Q}_{HVAC}$ is generated and controlled by the HVAC system 100 to manage the indoor air temperature $T_{ia}$. Accordingly, $\dot{Q}_{HVAC}$ and $\dot{Q}_{other}$ are included on the right side of Eq. C above.

The second differential equation (Eq. D) above focuses on the rate of change $\dot{T}_m$ in the building mass temperature T. The capacity of the building mass to receive or give off heat is modelled by capacitor 318. Capacitor 318 has lumped mass thermal capacitance $C_m$ and is positioned between a ground 304 and the building mass node 310 and regulates the rate of change in the building mass temperature $T_m$. Accordingly, the capacitance $C_m$ is included on left side of Eq. D. Also branching from the building mass node 310 is resistor 312 leading to indoor air node 302. As mentioned above, this branch accounts for heat transfer $\dot{Q}_m$ between the building mass 204 and the indoor air 201. Accordingly, the term $$\frac{1}{R_{mi}}(T_{ia} - T_m)$$

is included on the right side of Eq. D.

As described in detail below, the model represented by diagram 300 is used by the controller 212 in generating a control signal for the HVAC equipment 210. More particularly, the controller 212 uses a state-space representation of the model shown in diagram 300. The state-space representation used by the controller 212 can be derived by incorporating Eq. A and B with Eq. C and D, and writing the resulting system of equations as a linear system of differential equations to get:

$$\begin{bmatrix} \dot{T}_{ia} \\ \dot{T}_m \\ \dot{I} \end{bmatrix} = \begin{bmatrix} \frac{1}{C_{ia}}\left(K_{P,j} - \frac{1}{R_{mi}} - \frac{1}{R_{oi}}\right) & \frac{1}{C_{ia}R_{mi}} & \frac{K_{I,j}}{C_{ia}} \\ \frac{1}{C_m R_{mi}} & -\frac{1}{C_m R_{mi}} & 0 \\ -1 & 0 & 0 \end{bmatrix} \quad \text{(Eq. E)}$$

$$\begin{bmatrix} T_{ia} \\ T_m \\ I \end{bmatrix} + \begin{bmatrix} -\frac{K_{P,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other};$$

$$\begin{bmatrix} T_{ia} \\ \dot{Q}_{HVAC,j} \end{bmatrix} = \begin{bmatrix} 1 & 0 & 0 \\ -K_{P,j} & 0 & K_{I,j} \end{bmatrix} \begin{bmatrix} T_{ia} \\ T_m \\ I \end{bmatrix} + \begin{bmatrix} 0 & 0 \\ K_{P,j} & 0 \end{bmatrix} \begin{bmatrix} T_{sp,j} \\ T_{oa} \end{bmatrix}; \quad \text{(Eq. F)}$$

where I represents the integral term $\int_0^t \varepsilon_{sp}(s)\,ds$ from Eq. A. The resulting linear system has three states ($T_{ia}$, $T_m$, I), two inputs ($T_{sp,j}$, $T_{oa}$), two outputs ($T_{ia}$, $\dot{Q}_{HVAC}$), and one disturbance $\dot{Q}_{other}$. Because $\dot{Q}_{other}$ is not measured or controlled, the controller 212 models the disturbance $\dot{Q}_{other}$ using an input disturbance model that adds a forth state d to the state space representation. In a more compact form, this linear system of differential equations can be written as:

$$\dot{x}(t) = A_c(\theta)x(t) + B_c(\theta)u(t); \quad \text{(Eq. G)}$$

$$y(t) = C_c(\theta)x(t) + D_c(\theta)u(t); \quad \text{(Eq. H)}$$

where $$A_c(\theta) = \begin{bmatrix} -(\theta_1 + \theta_2 + \theta_3\theta_4) & \theta_2 & \theta_3\theta_4\theta_5 \\ \theta_6 & -\theta_6 & 0 \\ -1 & 0 & 0 \end{bmatrix},$$

$$B_c(\theta) = \begin{bmatrix} \theta_3\theta_4 & \theta_1 \\ 0 & 0 \\ 1 & 0 \end{bmatrix}, \quad C_c(\theta) = \begin{bmatrix} 1 & 0 & 0 \\ -\theta_4 & 0 & \theta_5\theta_4 \end{bmatrix},$$

$$D_c(\theta) = \begin{bmatrix} 0 & 0 \\ \theta_4 & 0 \end{bmatrix}; \theta_1 = \frac{1}{C_{ia}R_{oi}}; \theta_2 = \frac{1}{C_{ia}R_{mi}}; \theta_3 = \frac{1}{C_{ia}}$$

$$\theta_4 = K_p; \theta_5 = \frac{1}{\tau}; \theta_6 = \frac{1}{C_m R_m}; \text{ and}$$

$$\dot{x}(t) = \begin{bmatrix} \dot{T}_{ia} \\ \dot{T}_m \\ \dot{I} \end{bmatrix}; x(t) = \begin{bmatrix} T_{ia} \\ T_m \\ I \end{bmatrix}; u(t) = \begin{bmatrix} T_{sp,j} \\ T_{oa} \end{bmatrix},$$

As described in detail below, the controller 212 uses a two-step process to parameterize the system. In the first step, the controller 212 identifies the system parameters $\theta = \{\theta_1,$ $\theta_2, \theta_3, \theta_4, \theta_5, \theta_6\}$ (i.e., the values of $C_{ia}$, $C_m$, $R_{mi}$, $R_{oi}$, $K_{p,j}$, $K_{i,j}$). The disturbance state d is then introduced into the model and an Kalman estimator gain is added, such that in the second step the controller 212 identifies the Kalman gain parameters K. In some embodiments, the temperature setpoint $T_{sp}$ is not used as a system input, rather, $\dot{Q}_{HVAC}$ is used as a direct input for controller 212 in generating a control signal for the HVAC equipment 210.

As used herein, the term 'variable' refers to an item/quantity capable of varying in value over time or with respect to change in some other variable. A "value" as used herein is an instance of that variable at a particular time. A value may be measured or predicted. For example, the temperature setpoint $T_{sp}$ is a variable that changes over time, while $T_{sp}(3)$ is a value that denotes the setpoint at time step 3 (e.g., 68 degrees Fahrenheit). The term "predicted value" as used herein describes a quantity for a particular time step that may vary as a function of one or more parameters.

Controller for HVAC Equipment with System Identification

Figure 4:
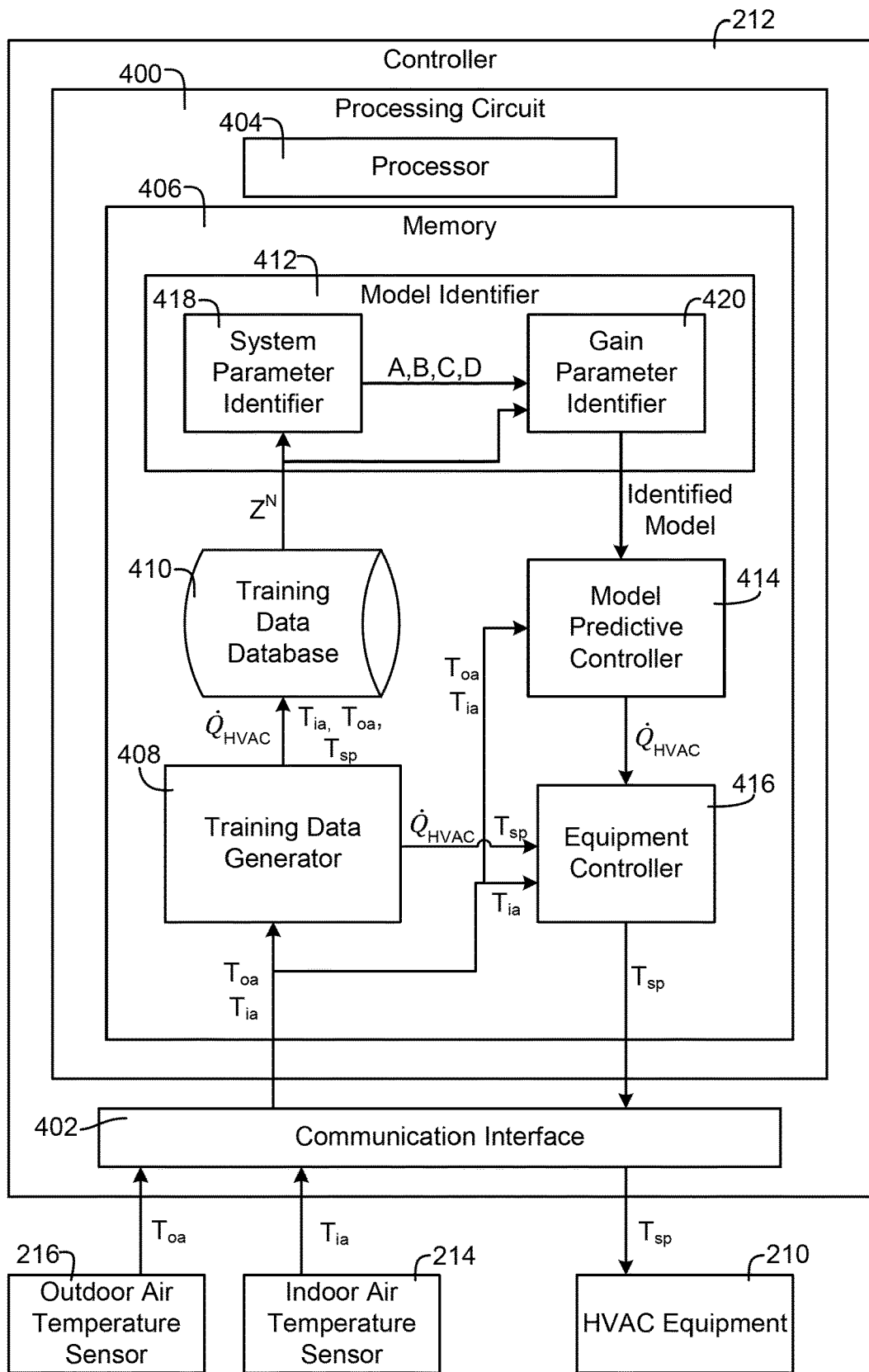
FIG. 4 is a block diagram of a controller for use with the HVAC system of FIG. 1, according to some embodiments.

Referring now to FIG. 4, a detailed diagram of the controller 212 is shown, according to an exemplary embodiment. The controller 212 includes a processing circuit 400 and a communication interface 402. The communication interface 402 is structured to facilitate the exchange of communications (e.g., data, control signals) between the processing circuit 400 and other components of HVAC system 100. As shown in FIG. 4, the communication interface 402 facilitates communication between the processing circuit 400 and the outdoor air temperature sensor 216 and the indoor air temperature sensor 214 to all temperature measurements $T_{oa}$ and $T_{ia}$ to be received by the processing circuit 400. The communication interface 402 also facilitates communication between the processing circuit 400 and the HVAC equipment 210 that allows a control signal (indicated as temperature setpoint $T_{sp}$) to be transmitted from the processing circuit 400 to the HVAC equipment 210.

The processing circuit 400 is structured to carry out the functions of the controller described herein. The processing circuit 400 includes a processor 404 and a memory 406. The processor 404 may be implemented as a general-purpose processor, an application-specific integrated circuit, one or more field programmable gate arrays, a digital signal processor, a group of processing components, or other suitable electronic processing components. The memory 406, described in detail below, includes one or more memory devices (e.g., RAM, ROM, NVRAM, Flash Memory, hard disk storage) that store data and/or computer code for facilitating at least some of the processes described herein. For example, the memory 406 stores programming logic that, when executed by the processor 404, controls the operation of the controller 212. More particularly, the memory 406 includes a training data generator 408, a training data database 410, a model identifier 412, a model predictive controller 414, and an equipment controller 416. The various generators, databases, identifiers, controllers, etc. of memory 406 may be implemented as any combination of hardware components and machine-readable media included with memory 406.

The equipment controller 416 is configured to generate a temperature setpoint $T_{sp}$ that serves as a control signal for the HVAC equipment 210. The equipment controller receives inputs of the indoor air temperature $T_{ia}$ from the indoor air temperature sensor 214 via the communication interface 402 and $\dot{Q}_{HVAC}$ from the model predictive controller 414 (during normal operation) and the training data generator 408 (during a training data generation phase described in detail below). The equipment controller uses $T_{ia}$ and $\dot{Q}_{HVAC}$ to generate $T_{sp}$ by solving Eq. A and Eq. B above for $T_{sp}$. The equipment controller 416 then provides the control signal $T_{sp}$ to the HVAC equipment 210 via the communication interface 402.

The model predictive controller 414 determines $\dot{Q}_{HVAC}$ based on an identified model and the temperature measurements $T_{ia}$, $T_{oa}$, and provides $\dot{Q}_{HVAC}$ to the equipment controller 416. The model predictive controller 414 follows a model predictive control (MPC) approach. The MPC approach involves predicting future system states based on a model of the system, and using those predictions to determine the controllable input to the system (here, $\dot{Q}_{HVAC}$) that bests achieves a control goal (e.g., to maintain the indoor air temperature near a desired temperature). A more accurate model allows the MPC to provide better control based on more accurate predictions. Because the physical phenomena that define the behavior of the system (i.e., of the indoor air 201 in the building 10) are complex, nonlinear, and/or poorly understood, a perfect model derived from first-principles is generally unachievable or unworkable. Thus, the model predictive controller 414 uses a model identified through a system identification process facilitated by the training data generator 408, the training data database 410, and the model identifier 412, described in detail below.

System identification, as facilitated by the training data generator 408, the training data database 410, and the model identifier 412, is a process of constructing mathematical models of dynamic systems. System identification provides a suitable alternative to first-principles-derived model when first principles models are unavailable or too complex for on-line MPC computations. System identification captures the important and relevant system dynamics based on actual input/output data (training data) of the system, in particular by determining model parameters particular to a building or zone to tune the model to the behavior of the building/zone. As described in detail below, the training data generator 408, the training data database 410, and the model identifier 412 each contribute to system identification by the controller 212.

The training data generator 408 is configured to generate training data by providing an excitation signal to the system. In some embodiments, the training data generator 408 provides various $\dot{Q}_{HVAC}$ values to the equipment controller 416 for a number N of time steps k, and receives the measured output response of the indoor air temperature $T_{ia}$ at each time step k from the air temperature sensor 214. The various $\dot{Q}_{HVAC}$ values may be chosen by the training data generator 408 to explore the system dynamics as much as possible (e.g., across a full range of possible $\dot{Q}_{HVAC}$ values, different patterns of $\dot{Q}_{HVAC}$ values, etc.). In some embodiments, the training data generator 408 provides various $T_{sp}$ values to the equipment controller 416 instead of the various values of $\dot{Q}_{HVAC}$.

If the equipment controller 416 receives the various $\dot{Q}_{HVAC}$ values, various control inputs $T_{sp}$ can be generated in response. The temperature setpoint $T_{sp}$ for each time step k is provided to the HVAC equipment 210, which operates accordingly to heat or cool the zone 200 (i.e., to influence $T_{ia}$). In some embodiments, the temperature setpoints $T_{sp}$ are used by the training data generator 408 to be included in the training data. The training data generator receives an updated measurement of the indoor air temperature $T_{ia}$ for each time step k and may also receive the outdoor air temperature $T_{oa}$ for each time step k. The training data generator 408 thereby causes the states, inputs, and outputs of the system to vary across the time steps k and generates data corresponding to the inputs and outputs.

The inputs and outputs generated by the training data generator 408 are provided to the training data database 410. More particularly, in the nomenclature of the model of Eq. E and Eq. F above, the training data generator 408 provides inputs $T_{sp}$ and $T_{oa}$ and outputs $\dot{Q}_{HVAC}$ and $T_{ia}$ for each time step k to the training data database 410.

The training data database 410 stores the inputs and outputs for each time step k provided by the training data generator 408. Each input and output is tagged with a time step identifier, so that data for the same time step can be associated together. The training data database 410 thereby collects and stores input and output data for each time step k, k 0, . . . , N, or, more specifically, $T_{sp}(k)$, $T_{oa}(k)$, $T_{ia}(k)$, and $\dot{Q}_{HVAC}(k)$, for k, k 0, . . . , N. This data is grouped together in the training data database 410 in a set of training data $Z^N$. In the notation of Eq. G and Eq. H, $Z^N$=[y(1), u(1), y(2), u(2), . . . , y(N), u(N)].

In some embodiments, the training data is refined using a saturation detection and removal process. System and methods for saturation detection and removal suitable for use to refine the training data $Z^N$ are described in U.S. patent application Ser. No. 15/900,459, filed Feb. 20, 2018, incorporated by reference herein in its entirety. For example, as described in detail therein, the training data may be filtered by determining whether the operating capacity is in a non-transient region for a threshold amount of a time period upon determining that an error for the building zone exists for the time period, and in response to a determination that the operating capacity is in the non-transient region for at least the threshold amount of the time period, indicating the time period as a saturation period. Data from the saturation period can then be removed from the training data.

The model identifier 412 accesses the training data database 410 to retrieve the training data $Z^N$ and uses the training data $Z^N$ to identify a model of the system. The model identifier 412 includes a system parameter identifier 418 and a gain parameter identifier 420. As shown in detail in FIG. 5 and discussed in detail with reference thereto, the system parameter identifier 418 carries out a first step of system identification, namely identifying the model parameters, while the gain parameter identifier 420 carries out the second step, namely determining a Kalman gain estimator. The model parameters and the Kalman gain estimator are included in an identified model of the system, and that model is provided to the model predictive controller 414. The model predictive controller can thus facilitate the control of the HVAC equipment 210 as described above.

Figure 5:
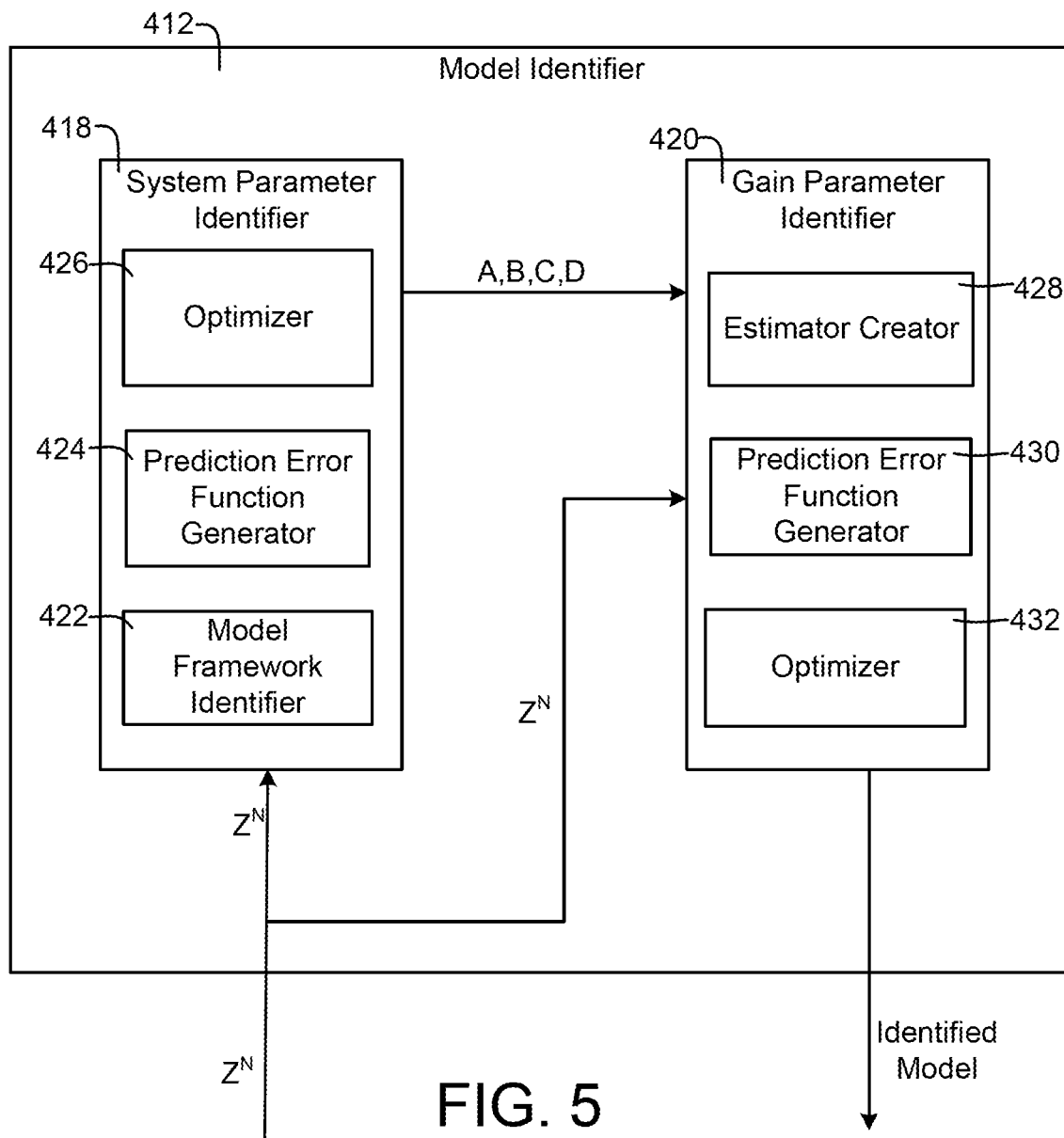
FIG. 5 is a detailed block diagram of a model identifier of the controller of FIG. 4, according to some embodiments.

Referring now to FIG. 5, a detailed view of the model identifier 412 is shown, according to an exemplary embodiment. As mentioned above, the model identifier 412 includes the system parameter identifier 418 and the gain parameter identifier 420. The system parameter identifier 418 is structured to identify the matrices A, B, C, D of Eqs. G and H, i.e., the values of $\theta=\{\theta_1, \theta_2, \theta_3, \theta_4, \theta_5, \theta_6\}$. In the embodiment described herein, this corresponds to finding the values of $C_{ia}$, $C_m$, $R_{mi}$, $R_{oi}$, $K_{p,j}$, and $K_{i,j}$.

The system parameter identifier 418 includes a model framework identifier 422, a prediction error function generator 424, and an optimizer 426. The model framework identifier 422 identifies that the model of the system, denoted as $\mathcal{M}(\theta)$, corresponds to the form described above in Eqs. G and H, i.e., $$\dot{x}(t)=A_c(\theta)x(t)+B(\theta)u(t); \quad \text{(Eq. G)}$$

$$y(t)=C_c(\theta)x(t)+D_c(\theta)u(t); \quad \text{(Eq. H)}.$$

The model framework identifier 422 thereby determines that the system parameter identifier 418 has the goal of determining a parameter vector $\hat{\theta}_N$ from the set of $\theta \in D_{\mathcal{M}} \subset \mathbb{R}^d$, where $D_{\mathcal{M}}$ is the set of admissible model parameter values. The resulting possible models are given by the set: M=$\{\mathcal{M}(\theta), \theta \in D_{\mathcal{M}}\}$. The goal of the system parameter identifier 418 is to select a parameter vector $\hat{\theta}_N$ from among possible values of $\theta$ that best matches the model to the physical system (i.e., the vector $\theta$ is a list of variables and the vector $\hat{\theta}_N$ is a list of values), thereby defining matrices A, B, C, and D. The model framework identifier 422 also receives training data $Z^N$ and sorts the training data (i.e., $T_{sp}(k)$, $T_{oa}(k)$, $T_{ia}(k)$, and $\dot{Q}_{HVAC}(k)$, for k, k=0, . . . , N) into the notation of Eq. G-H as input/output data $Z^N$=[y(1), u(1), y(2), u(2), . . . , y(N), u(N)].

The prediction error function generator 424 receives the model framework M=$\{\mathcal{M}(\theta), \theta \in D_{\mathcal{M}}\}$ and the training data $Z^N$ from the model framework identifier 422. The prediction error function generator 424 applies a prediction error method to determine the optimal parameter vector $\hat{\theta}_N$. In general, prediction error methods determine the optimal parameter vector $\hat{\theta}_N$ by minimizing some prediction performance function $V_N(\theta, Z^N)$ that is based in some way on the difference between predicted outputs and the observed/measured outputs included in the training data $Z^N$. That is, the parameter estimation $\hat{\theta}_N$ is determined as:

$$\hat{\theta}_N=\hat{\theta}_N(Z^N)=\arg\min_{\theta \in D_{\mathcal{M}}} V_N(\theta, Z^N).$$

The prediction error function generator 424 use one or more of several possible prediction error approaches to generate a prediction performance function $V_N(\theta, Z^N)$. In the embodiment shown, the prediction error function generator 424 applies a simulation approach. In the simulation approach, the prediction error function generator 424 uses the model $\mathcal{M}(\theta)$, the input trajectory [u(1), u(2), . . . , u(N)], and an initial state x(0) to produce predicted outputs in terms of $\theta$. That is, the prediction error function generator 424 predicts:

$$[\hat{y}(1|0,\theta), \hat{y}(2|0,\theta) \ldots \hat{y}(k|0,\theta) \ldots \hat{y}(N|0,\theta)],$$

where $\hat{y}(k|0, \theta)$ denotes the predicted output at time step k given the training data from time 0 and the model $\mathcal{M}(\theta)$. The prediction error function generator 424 then calculates a prediction error at each time step k is given by $\varepsilon(k, \theta):=y(k)-\hat{y}(k|0, \theta)$. The prediction error function generator 424 then squares the two-norm of each prediction error $\varepsilon(k, \theta)$ and sums the results to determine the prediction performance function, which can be written as:

$$V_N(\theta, Z^N)=\Sigma_{k=1}^N \|y(k)-\hat{y}(k|0,\theta)\|_2^2 \quad \text{(Eq. I)}.$$

In an alternative embodiment, the prediction error function generator 424 applies a one-step-ahead prediction error method to generate the prediction performance function $V_N(\theta, Z^N)$. In the one-step-ahead prediction error method, the prediction error function generator 424 uses past input-output data and the model $\mathcal{M}(\theta)$ the model to predict the output one step ahead in terms of $\theta$. That is, in the one-step ahead prediction error method, the prediction error function generator 424 generates one-step ahead predictions $\hat{y}(k|k-1, \theta)$, which denotes the predicted output at time step k given the past input-output sequence $Z^{k-1}$ and using parameters $\theta$. The one-step ahead prediction $\hat{y}(k|k-1, \theta)$ is then compared to the measured output y(k) by the prediction error function generator 424 to determine the prediction error at k, defined as $\varepsilon(k, \theta):=y(k)-\hat{y}(k|k-1, \theta)$. The prediction error function generator 424 then squares the two-norm of the prediction errors for each k and sums the results, generating a prediction performance function that can be expressed in a condensed form as:

$$V_N(\theta, Z^N) = \frac{1}{N}\sum_{k=1}^{N} \|y(k) - \hat{y}(k|k-1, \theta)\|_2^2. \quad \text{(Eq. J)}$$

In other alternative embodiments, the prediction error function generator 424 uses a multi-step ahead prediction error approach to generate the prediction performance function. The multi-step ahead prediction error approach is described in detail below with reference to the gain parameter identifier 420 and FIGS. 7-8.

The prediction error function generator 424 then provides the performance function $V_N(\theta, Z^N)$ (i.e., from Eq. I or Eq. J in various embodiments) to the optimizer 426.

The optimizer 426 receives the prediction error function generated by the prediction error function generator 424 and optimizes the prediction error function in $\theta$ to determine $\hat{\theta}_N$. More specifically, the optimizer 426 finds the minimum value of the prediction error function $V_N(\theta, Z^N)$ as $\theta$ is varied throughout the allowable values of $\theta \in D_M$. That is, the optimizer 426 determines $\hat{\theta}_N$ based on:

$$\hat{\theta}_N = \hat{\theta}_N(Z^N) = \arg\min_{\theta \in D_M} V_N(\theta, Z^N).$$

The optimizer 426 then uses $\hat{\theta}_N$ to calculate the matrices A, B, C, and D. The system parameter identifier 418 then provides the identified matrices A, B, C, D to the gain parameter identifier 420.

The gain parameter identifier 420 receives the model with the matrices A, B, C, D (i.e., the model parameters) from system parameter identifier 418, as well as the training data $Z^N$ from the training data database 410, and uses that information to identify the gain parameters. The gain parameter identifier 420 includes an estimator creator 428, a prediction error function generator 430, and an optimizer 432.

The estimator creator 428 adds a disturbance model and introduces a Kalman estimator gain to account for thermal dynamics of the system, for example for the influence of $\dot{Q}_{other}$ on the system. The estimator creator 428 generates an augmented model with disturbance state d, given by:

$$\begin{bmatrix} \dot{x}(t) \\ \dot{d}(t) \end{bmatrix} = \begin{bmatrix} A_c & B_d \\ 0 & 0 \end{bmatrix}\begin{bmatrix} x(t) \\ d(t) \end{bmatrix} + \begin{bmatrix} B_c \\ 0 \end{bmatrix}u(t);$$

$$y(t) = [\, C_c \quad C_d \,]\begin{bmatrix} x(t) \\ d(t) \end{bmatrix} + D_c u(t)$$

where the parameters $A_c$, $B_c$, $C_c$, and $D_c$ are the matrices A, B, C, D received from the system parameter identifier 418 and the disturbance model is selected with $$B_d = \frac{1}{c_{ia}} \text{ and } C_d = 0.$$

The estimator creator 428 then converts the model to a discrete time model, for example using 5-minute sampling periods, resulting in the matrices $A_{dis}$, $B_{dis}$, $C_{dis}$, $D_{dis}$ and the disturbance model discrete time matrix $B_{d_{dis}}$. The estimator creator 428 then adds a parameterized estimator gain resulting in the following model:

$$\begin{bmatrix} \hat{x}(t+1|t) \\ \hat{d}(t+1|t) \end{bmatrix} = \begin{bmatrix} A_{dis} & B_{d_{dis}} \\ 0 & I \end{bmatrix}\begin{bmatrix} \hat{x}(t|t-1) \\ \hat{d}(t|t-1) \end{bmatrix} + \begin{bmatrix} B_{dis} \\ 0 \end{bmatrix}u(t) + \quad \text{(Eq. K)}$$

$$\underbrace{\begin{bmatrix} K_x(\phi) \\ K_d(\phi) \end{bmatrix}}_{=:K(\phi)}(y(t) - \hat{y}(t|t-1));$$

$$\hat{y}(t|t-1) = [\, C_{dis} \quad 0 \,]\begin{bmatrix} \hat{x}(t|t-1) \\ \hat{d}(t|t-1) \end{bmatrix} + D_{dis}u(t). \quad \text{(Eq. L)}$$

The matrix $K(\phi)$ is the estimator gain parameterized with the parameter vector $\phi$ where:

$$K_x(\phi) = \begin{bmatrix} \phi_1 & \phi_2 \\ \phi_3 & \phi_4 \\ \phi_5 & \phi_6 \end{bmatrix};$$

$$K_d(\phi) = [\, \phi_7 \quad \phi_8 \,].$$

In this notation, $\hat{x}(t+1|t)$ is an estimate of the state at time t+1 obtained using the Kalman filter and made utilizing information at sampling time t. For example, with a sampling time of five minutes, $\hat{x}(t+1|t)$ is an estimate of the state five minutes after the collection of the data that the estimate is based on. The goal of the gain parameter identifier is to identify parameters $\hat{\phi}_N$ (i.e., a vector of for each of $\phi_1 \ldots \phi_8$) that make the model best match the physical system.

The estimator creator 428 then provides the discrete time model with estimator gain (i.e., Eqs. K-L) to the prediction error function generator 430. The prediction error function generator receives the model from the estimator creator 428 as well as the training data $Z^N$ from the training data database 410, and uses the model (with the estimator gain) and the training data $Z^N$ to generate a prediction performance function.

Figure 7:
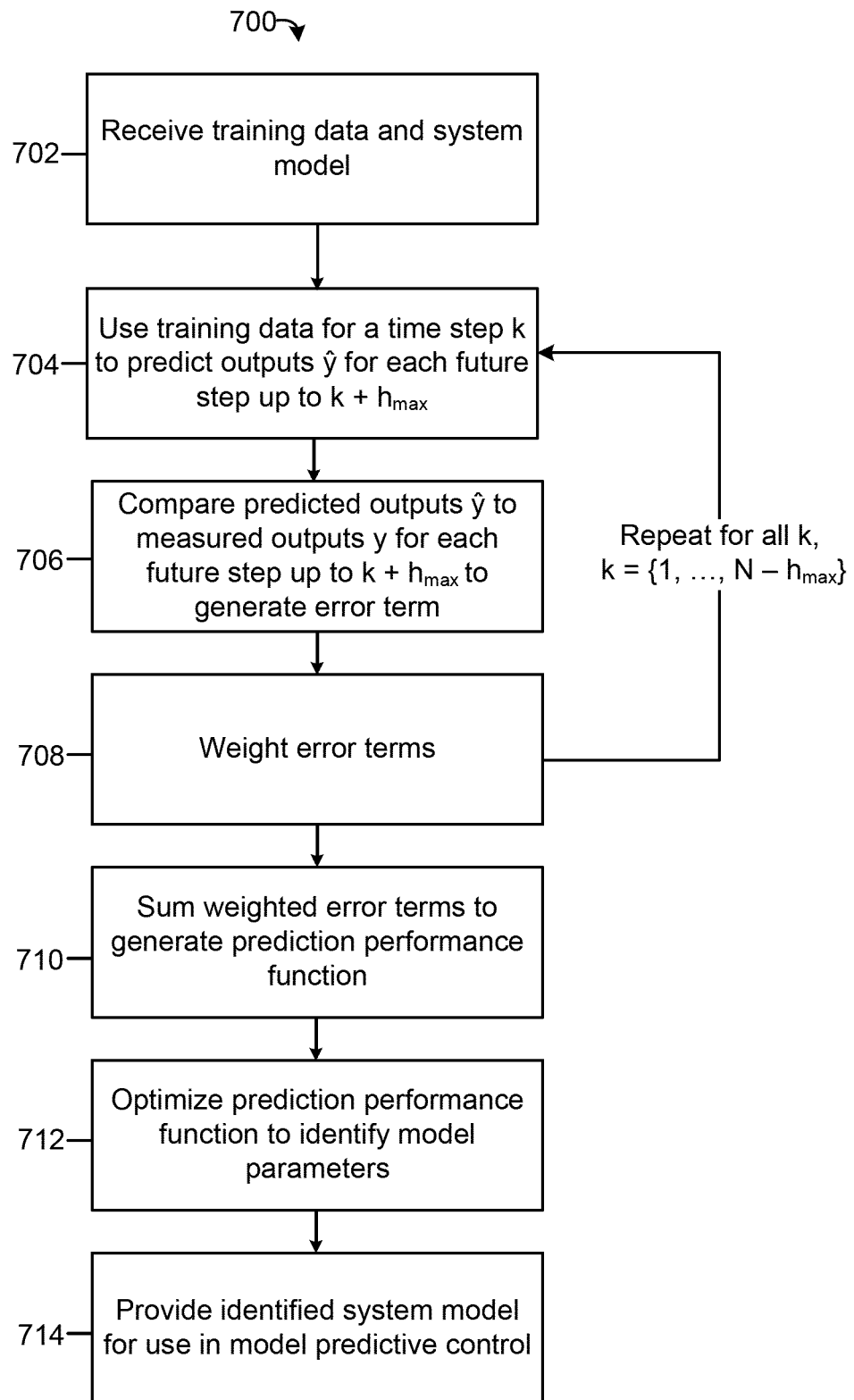
FIG. 7 is a flowchart of a multi-step ahead prediction error method for use in system identification, according to some embodiments.
Figure 8:
FIG. 8 is a visualization useful in illustrating the multi-step ahead prediction error method of FIG. 7, according to some embodiments.
Figure 9:
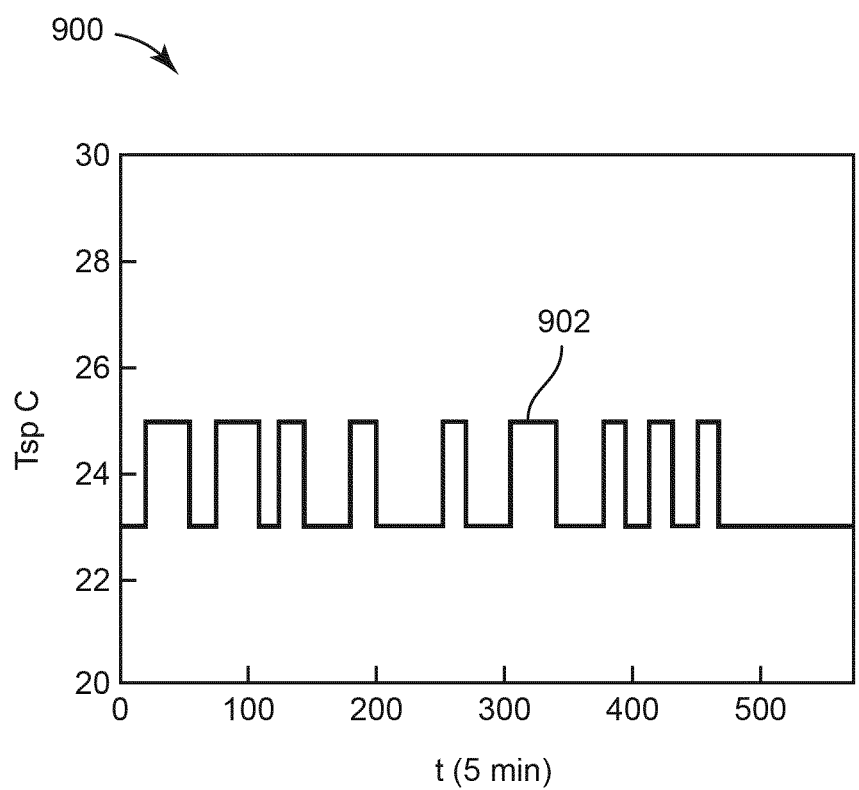
FIG. 9 is graph of an excitation signal used in a cooling experiment to test the controller of FIG. 4, according to some embodiments.

The prediction error function generator 430 follows a multi-step ahead prediction error method to generate a predication performance function $V_N(\phi, Z^N)$. The multi-step ahead prediction error method is illustrated in FIGS. 7-8 and described in detail with reference thereto. As an overview, in the multi-step-ahead prediction error method, the prediction error function generator 430 uses past input-output data and the model $\mathcal{M}(\theta)$ the model to predict the output multiple step ahead in terms of $\phi$. That is, in the multi-step ahead prediction error method, the prediction error function generator 430 generates multi-step ahead predictions $\hat{y}(k+h|k-1, \phi)$, which denotes the predicted output at time step k+h given the past input-output sequence $Z^{k-1}$ and using parameters $\phi$. The index h corresponds the number of steps ahead the prediction is made, and for each time step k predictions are made for $h=0, \ldots, h_{max}$ (i.e., when h=2, the prediction is three steps ahead because h is indexed from zero).

Each multiple multi-step ahead prediction $\hat{y}(k+h|k-1, \phi)$ is then compared to the corresponding measured output y(k) by the prediction error function generator 430 to determine the prediction error at k, defined as $\varepsilon(k, \theta) := y(k) - \hat{y}(k+h|k-1, \phi)$. The prediction error function generator 430 then squares the two-norm of the prediction errors for each k and sums the results, in some embodiments using an weighting function w(h). The prediction error function generator 430 thereby generates a prediction performance function that can be expressed in a condensed form as:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad \text{(Eq. M)}$$

The multi-step ahead prediction error method is described in more detail below with reference to FIGS. 7-8. In alternative embodiments, the prediction error function generator 430 follows the simulation approach or the one-step ahead prediction error approach discussed above with reference to the prediction error function generator 424.

The prediction error function generator 430 then provides the prediction performance function (i.e., Eq. M) to the optimizer 432. The optimizer 432 receives the prediction error function $V_N(\phi, Z^N)$ generated by the prediction error function generator 430 and optimizes the prediction error function in $\phi$ to determine $\hat{\phi}_N$. More specifically, the optimizer 426 finds the minimum value of the prediction error function $V_N(\phi, Z^N)$ as $\phi$ is varied throughout the allowable values of $\phi$. In some cases, all real values of $\phi$ are allowable. That is, the optimizer 426 determines $\hat{\phi}_N$ based on:

$$\hat{\phi}_N = \hat{\phi}_N(Z^N) = \arg\min_\phi V_N(\phi, Z^N)$$

The optimizer 432 then uses $\hat{\phi}_N$ to calculate the matrices $K_x(\phi)$ and $K_d(\phi)$, resulting in a fully identified model. The gain parameter identifier 420 provides the identified model to the model predictive controller 414.

In some embodiments, the prediction error function generator 430 reconfigures the multi-step ahead prediction problem by defining augmented vectors that allow the multi-step ahead prediction performance function (Eq. M) to be recast in an identical structure to the single-step ahead prediction performance function (Eq. J). Existing software toolboxes and programs (e.g., Matlab system identification toolbox) configured to handle the single-step ahead prediction error approach can then be used to carry out the multi-step ahead prediction error approach. To reconfigure the problem for that purpose, the prediction error function generator 430 considers, the system model of the form:

$$x(k+1) = Ax(k) + Bu(k);$$

$$y(k) = Cx(k) + Du(k).$$

where the one-step prediction of $\hat{x}(k+1|k)$ using a steady-state Kalman gain is:

$$\hat{x}(k+1|k) = A\hat{x}(k|k-1) + Bu(k) + K(y(k) - C\hat{x}(k|k-1) - Du(k));$$

$$\hat{y}(k|k-1) = C\hat{x}(k|k-1) + Du(k).$$

In the multi-step prediction Kalman gain system identification problem, the complete pattern of the algebraic manipulations is shown by the 4-step prediction. The prediction error function generator 430 considers a case with four input data points and four output data-points starting from time h=0 to time h=3, so that $h_{max}=3$. The one-step prediction (with the prediction error function generator 430 given x) is given by the equation:

$$\hat{x}(1|0) = Ax0 + Bu(0) + K(y(0) - Cx - Du(0));$$

$$\hat{y}(0|0) = Cx0 + Du(0).$$

The prediction of the second step is $$\hat{x}(2|0) = A\hat{x}(1|0) + Bu(1) = A(Ax0 + Bu(0) + K(y(0) - Cx0 - Du(0))) + Bu(1);$$

$$\hat{y}(1|0) = C\hat{x}(1|0) + Du(1) = C(Ax0 + Bu(0) + K(y(0) - Cx0 - Du(0))) + Du(1).$$

The prediction of the third step is $$\hat{x}(3|0) = A\hat{x}(2|0) + Bu(2) = A(A(Ax0 + Bu(0) + K(y(0) - Cx0 - Du(0))) + Bu(1)) + Bu(2);$$

$$\hat{y}(2|0) = C\hat{x}(2|0) + Du(2) = C(A(Ax0 + Bu(0) + K(y(0) - Cx0 - Du(0))) + Bu(1)) + Du(2).$$

The forth step prediction is $$\hat{x}(4|0) = A\hat{x}(3|0) + Bu(3) =$$
$$A(A(A(Ax0 + Bu(0) + K(y(0) - Cx0 - Du(0))) + Bu(1)) + Bu(2)) + Bu(3);$$

$$\hat{y}(3|0) = C\hat{x}(3|0) + Du(3) =$$
$$C(A(A(Ax0 + Bu(0) + K(y(0) - Cx0 - Du(0))) + Bu(1)) + Bu(2)) + Du(3).$$

With these 4-step predictions, the pattern needed to cast the multi-step prediction problem as a 1-step prediction is revealed. By aggregating the matrices multiplying x0, y(0), u(0), u(1), u(2), and u(3), the pattern revealed is:

$$\hat{x}(1|0) = Ax0 + Bu(0) + K(y(0) - Cx0 - Du(0));$$

$$\hat{x}(2|0) = (A^2 - AKC)x0 + (AB - AKD)u(0) + Bu(1) + AKy(0);$$

$$\hat{x}(3|0) = (A^3 - A^2KC)x0 + (A^2B - A^2KD)u(0) + ABu(1) + Bu(2) + A^2Ky(0);$$

$$\hat{x}(4|0) = (A^4 - A^3KC)x0 + (A^3B - A^3KD)u(0) + A^2Bu(1)ABu(2) + Bu(3) + A^3Ky(0);$$

$$\hat{y}(0) = Cx0 + Du(0);$$

$$\hat{y}(1|0) = (CA - CKC)x0 + (CB - CKD)u(0) + Du(1) + CKy(0);$$

$$\hat{y}(2|0) = (CA^2 - CAKC)x0 + (CAB - CAKD)u(0) + CBu(1) + Du(2) + CAKy(0);$$

$$\hat{y}(3|0) = (CA^3 - CA^2KC)x0 + (CA^2B - CA^2KD)u(0) + CABu(1) + CBu(2) + Du(3) + CA^2Ky(0).$$

Based on that pattern, the prediction error function generator 430 defines the following vectors:

$$\tilde{u}(0) = \begin{bmatrix} u(0) \\ u(1) \\ u(2) \\ u(3) \\ y(0) \end{bmatrix}, \tilde{\hat{y}}(0) = \begin{bmatrix} \hat{y}(0) \\ \hat{y}(1|0) \\ \hat{y}(2|0) \\ \hat{y}(3|0) \end{bmatrix}, \tilde{y}(0) = \begin{bmatrix} y(0) \\ y(1) \\ y(2) \\ y(3) \end{bmatrix},$$

$\hat{x}(1|0)$ and x0 remain unchanged.

The new system that has the 4-step prediction casted into a one-step prediction which can be analyzed by the prediction error function generator 430 using an existing system identification software product as:

$$\hat{x}(1\mid 0) = Ax0 + [B\ 0\ 0\ 0\ 0]\tilde{u}(0) + [K\ 0\ 0\ 0](\tilde{y}(0) - \hat{\tilde{y}}(0));$$

$$\hat{\tilde{y}}(0) = \begin{bmatrix} C \\ (CA - CKC) \\ (CA^2 - CAKC) \\ (CA^3 - CA^2KC) \end{bmatrix} x0 +$$

$$\begin{bmatrix} D & 0 & 0 & 0 & 0 \\ (CB - CKD) & D & 0 & 0 & CK \\ (CAB - CAKD) & CB & D & 0 & CAK \\ (CA^2B - CA^2KD) & CAB & CB & D & CA^2K \end{bmatrix} \tilde{u}(0).$$

In order to have the general formulation at time k for predicting $h_{max}$ step ahead in time, this four-step example can be extrapolated to define the general augmented input and output vectors as:

$$\hat{\tilde{y}}(k) = \begin{bmatrix} C \\ (CA - CKC) \\ (CA^2 - CAKC) \\ \vdots \\ (CA^{h_{max}} - CA^{h_{max}-1}KC) \end{bmatrix} \hat{x}(k\mid k-1) +$$

$$\begin{bmatrix} D & 0 & 0 & 0 & 0 & 0 & 0 \\ (CB - CKD) & D & 0 & 0 & 0 & 0 & CK \\ (CAB - CAKD) & CB & D & 0 & 0 & 0 & CAK \\ (CA^2B - CA^2KD) & CAB & \ddots & \ddots & 0 & 0 & CA^2K \\ \vdots & \vdots & \ddots & CB & D & 0 & \vdots \\ (CA^{h_{max}-1}B - CA^{h_{max}-1}KD) & CA^{h_{max}-2}B & \ldots & CAB & CB & D & CA^{h_{max}-1}K \end{bmatrix} \tilde{u}(k);$$

$$\tilde{u}(k) = \begin{bmatrix} u(k) \\ u(k+1) \\ \vdots \\ u(k+h_{max}) \\ y(k) \end{bmatrix},\ \hat{\tilde{y}}(k) = \begin{bmatrix} \hat{y}(k\mid k-1) \\ \hat{y}(k+1\mid k-1) \\ \vdots \\ \hat{y}(k+h_{max}\mid k-1) \end{bmatrix},\ \tilde{y}(k) = \begin{bmatrix} y(k) \\ y(k+1) \\ \vdots \\ y(k+h_{max}) \end{bmatrix}$$

With these definition, the general formulation at time k for predicting $h_{max}$ steps ahead in time is:

$$\hat{x}(k+1\mid k) = A\hat{x}(k\mid k-1) + [B0\ \ldots\ 0]\tilde{u}(k) + [K0\ \ldots\ 0](\tilde{y}(k) - \hat{\tilde{y}}(k)).$$

As described above, in the multi-step ahead prediction error method the prediction error function generator 430 generates a function of the form:

$$V_N(\phi, Z^N) = \sum_{k=1}^{N-h_{max}+1} \sum_{h=0}^{h_{max}} w(h)\|y(k+h) - y(k+h\mid k-1, \phi)\|_2^2. \quad \text{(Eq. M)}$$

If w(h)≡1 for all h, and using the augmented input and output vectors defined above, the multi-step ahead prediction performance function can be reconfigured into the following one-step ahead prediction performance function by the prediction error function generator 430:

$$V_N(\theta, Z^N) = V_N(\theta, Z^N) = \sum_{k=1}^{N-h_{max}+1} \|\tilde{y}(k) - \hat{\tilde{y}}(k,\theta)\|_2^2$$

The prediction error function generator 430 then uses this reconfigured format of the prediction performance function with existing software toolboxes suited for the one-step ahead prediction error approach. The prediction error function generator 430 may include machine-readable media storing computer code executable to apply such software.

System Identification Methods

Figure 6:
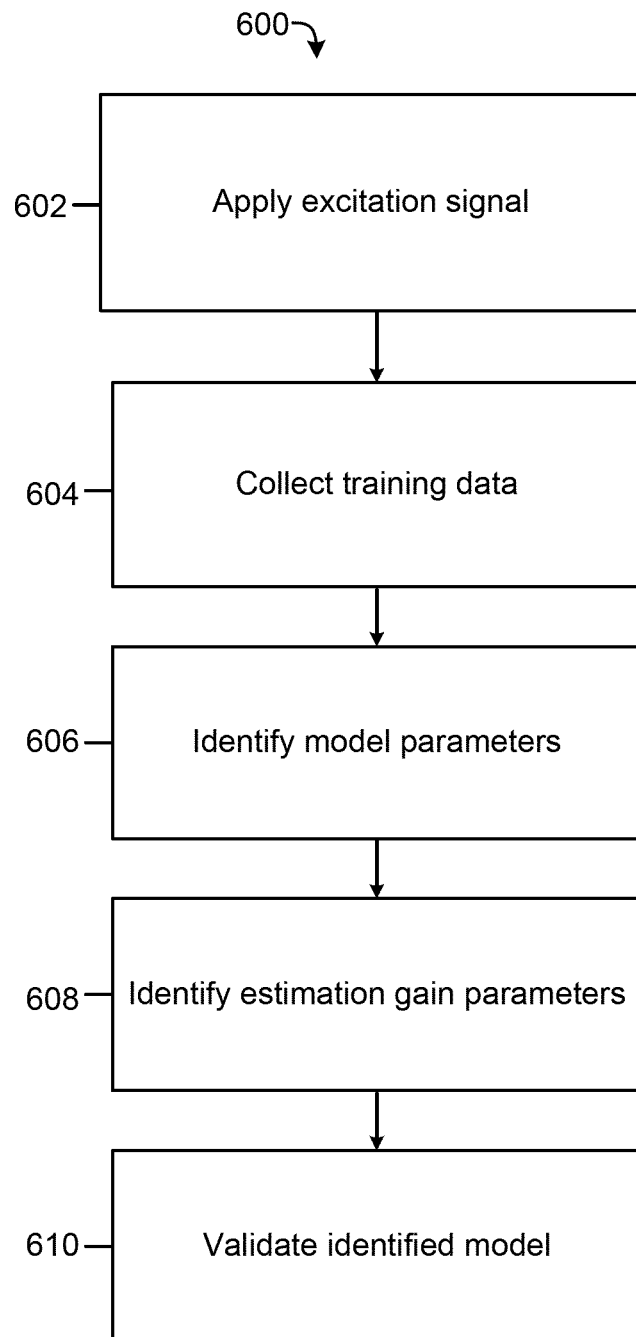
FIG. 6 is flowchart of a process for system identification, according to some embodiments.

Referring now to FIG. 6, a flowchart of a process 600 for system identification is shown, according to an exemplary embodiment. The process 600 can be carried out by the controller 212 of FIGS. 2 and 4.

At step 602, the controller 212 applies an excitation signal to the HVAC equipment 210. For example, the training data generator 408 may vary the $\dot{Q}_{HVAC}$ values supplied to the equipment controller 416, causing an excitation signal to be generated in the temperature setpoint $T_{sp}$ inputs provided to the HVAC equipment 210. In general, the excitation signal is designed to test the system in a way to provide robust data for use in system identification.

At step 604, training data is collected and stored by the controller 212. Training data includes measurable temperature readings, i.e., $T_{oa}$ and $T_{ia}$, controller-determined values HVAC and $T_{sp}$ for each of a plurality of time steps k, k=0, . . . , N. The training data therefore includes inputs u(k) and the outputs y(k) for the time period. The training data is received from temperature sensors 214, 216, training data generator 408, and/or equipment controller 416 and stored in training data database 410.

At step 606, the controller 212 identifies the model parameters for the system. That is, as discussed in detail above, the controller 212 determines the matrices A(θ), B(θ), C(θ), and D(θ) that minimize a prediction performance function $V_N(Z^N, \theta)$ for the model:

$$\dot{x}(t) = A_c(\theta)x(t) + B_c(\theta)u(t); \quad \text{(Eq. G)}$$

$$y(t) = C_c(\theta)x(t) + D_c(\theta)u(t). \quad \text{(Eq. H)}$$

In identifying the model parameters, a simulation approach or a one-step-ahead prediction error approach is followed in some embodiments. These approaches are described in detail above with reference to the prediction error function generator 424 of FIG. 5. In other embodiments, the model parameters are determined at step 606 using a multi-step ahead prediction error method, described in detail with reference to FIGS. 7-8.

At step 608, the controller 212 identifies the gain estimator parameters. That is, the controller 212 determines the matrices $K_x$ and $K_d$ of Eq. K above. In preferred embodiments, the controller 212 uses the multi-step ahead prediction error method to find the matrices $K_x$ and $K_d$. The multi-step ahead prediction error method is described in detail below with reference to FIGS. 7-8. In alternative embodiments, a simulation approach or a one-step-ahead prediction error approach is followed to find the matrices $K_x$ and $K_d$.

At step 610, the identified model is validated by the controller 212. The controller 212 uses the identified model to generate control signal inputs $T_{sp}$ for the HVAC equipment 210 using model predictive control. The controller then monitors the temperature measurements $T_{oa}$ and $T_{ia}$ from temperature sensors 214, 216, the input $T_{sp}$, and the value $\dot{Q}_{HVAC}$ to determine how well the model matches system behavior in normal operation. For example, the training data database 410 may collect and store an addition set of training data that can be used by the model identifier 412 to validate the model. If some discrepancy is determined, the identified model may be updated. The identified model can thereby by dynamically adjusted to adjust for changes in the physical system.

Referring now to FIGS. 7-8 the multi-step ahead prediction error approach for use in system identification is illustrated, according to an exemplary embodiment. In FIG. 7, a flowchart of a process 700 for identifying system parameters using the multi-step ahead prediction error approach is shown, according to an exemplary embodiment. FIG. 8 shows an example visualization useful in explaining process 700. Process 700 can be carried out by the system parameter identifier 418 and/or the gain parameter identifier 420 of FIG. 5. In the embodiment described herein, the process 700 is implemented with the gain parameter identifier 420.

Process 700 begins at step 702, where the gain parameter identifier 420 receives training data $Z^N=[y(1), u(1), y(2), u(2), \ldots, y(N), u(N)]$ from the training data database 410. The training data includes measured outputs $y(k)$ (i.e., $T_{ia}(k)$ and $\dot{Q}_{HVAC}(k)$) and inputs $u(k)$ (i.e., $T_{oa}(k)$ and $T_{sp}(k)$) for each time step k, $k=1, \ldots, N$. N is the number of samples in the training data. The gain parameter identifier 420 also receives the system model from the system parameter identifier 418.

At step 704, the prediction error function generator 430 uses the training data for a time step k to predict outputs y for each subsequent time step up to $k+h_{max}$. The value $h_{max}$ corresponds to the number of steps ahead the predictions are made, referred to herein as the prediction horizon. Because $h_{max}$ is indexed from zero in Eq. M above, the prediction horizon is one more than the value of $h_{max}$. For example, in the case shown in FIG. 8 and described below, predictions are made three steps ahead, corresponding to $h_{max}=2$ in the notation of Eq. D and a prediction horizon of three. The prediction horizon may be any integer greater than one, for example four or eight. The prediction horizon can be tuned experimentally, to determine an ideal prediction horizon. For example, too long of a prediction horizon may lead to poor prediction while too short of a prediction horizon may suffer the same limitations as the one-step ahead prediction error method mentioned above. In some cases, a prediction horizon of eight is preferred.

More specifically, at each step 704 the predicted outputs $[\hat{y}(k|k-1), \hat{y}(k+1|k-1), \ldots \hat{y}(k+h_{max}|k-1)]$ are predicted based on the past training data (i.e., through step k−1), denoted as $Z^{k-1}$, along with future inputs $[u(k), u(k+1) \ldots u(k+h_{max})]$. These predictions are made using the model $\mathcal{M}(\phi)$, such that predicted outputs $\hat{y}$ depend on $\phi$.

To illustrate the predictions of step 704, FIG. 8 shows a simplified visualization in which y(k) and ŷ(k) are depicted as scalar values for the sake of simplified explanation. In FIG. 8, the graph 800 plots the values of y and y over time t for five time steps past a starting time t=0. The solid circles 802 represent measured outputs y(t) from the training data. The unfilled boxes 804 represent predicted outputs $\bar{y}(t|0)$, that is, the outputs predicted for each time step based on the input/output data available at time t=0 (e.g., y(0)). The dashed lines represent the propagation of the predictions; for example, graph 800 includes three unfilled boxes 804 connected by a dashed line to the solid circle 802 corresponding to y(0). This shows that the predictions $\hat{y}(t|0)$, $1 \leq t \leq 3$, represented by the unfilled boxes 804 were based on the measured value of y(0).

At step 706, the prediction error function generator 430 compares the predicted outputs y to the measured outputs y for each future step up to $k+h_{max}$ (i.e., for all predicted outputs ŷ generated at step 704). More specifically, an error term for each step may be defined as $y(k+h)-\hat{y}(k+h\oplus k-1, \phi)$. Because y and ŷ are vectors, the two-norm of this error term may be taken and squared to facilitate comparison between prediction errors as scalars, such that the error term becomes $\|y(k+h)-\hat{y}(k+h|k-1, \theta)\|_2^2$. This term appears in Eq. M above.

As shown in FIG. 8, step 706 can be understood as measuring the distance between, for example, each unfilled box 804 and the corresponding solid circle 802 (i.e., the unfilled box 804 and the solid circle 802 at the same time t). Thus, in the example of FIG. 8, step 706 includes calculating three error terms.

At step 708, the error terms are weighted based on a weighting function w(h). The weighting function w(h) allows the prediction errors to be given more or less weight depending on how many steps ahead the prediction is. The weighting function w(h) is preferably a monotonically decreasing function of h, so that farther-out-in-time predictions have less influence on the prediction error. In some embodiments, the weighting function w(h)=1. Step 708 thereby corresponds the w(h) term in Eq. M above.

The process 700 then returns to step 704 to repeat steps 704-706 for each value of k, $k=1, N-h_{max}$. As illustrated in FIG. 8, repeating step 704 corresponds to generating the predictions represented by the unfilled circles 808 and the unfilled triangles 810. The unfilled circles 808 chart the predictions based on the output data available at time t=1, i.e., $\hat{y}(t|1)$, for t=2, 3, 4. The unfilled triangles chart the predictions based on the output data available at time t=2, i.e., $\hat{y}(t|2)$, for t=3, 4, 5. Process 700 therefore involves making multiple predictions for most time steps: for example, FIG. 8 shows three separate predictions for time t=3.

At step 706, the prediction error function generator 430 again compares the predicted outputs ŷ for the new value of k to the measured outputs y for each future step up to $k+h_{max}$ to define the error term $\|y(k+h)-\hat{y}(k+h|k-1, \theta)_2^2$ as included in Eq. M. At step 708, the terms are again weighted by the weighting function w(h). The weighting function w(h) may be the same for each k.

In the notation of Eq. M, each iteration of steps 704-708 thus corresponds to steps necessary to generate the values used by the inner (right) summation indexed in h, while repetition of the steps 704-708 corresponds to the iteration through k represented in the outer (left) summation. At step 710, then, these summations are executed. In other words, the system identification circuit 108 sums the weighted error terms generated by steps 704-708 to generate a prediction performance function as:

$$V_N(\phi, Z^N) = \sum_{k=1}^{N-h_{max}+1} \sum_{h=0}^{h_{max}} w(h)\|y(k+h) - \hat{y}(k+h|k-1, \phi)\|_2^2. \quad (Eq. M)$$

The prediction performance function is a function of the input data $Z^N$ and the parameter variable $\phi$. Typically, the input data $Z^N$ is given (i.e., received by the model identifier 412 and used in the calculation of error terms as described above). Thus, the prediction performance function is primarily a function of $\phi$.

At step 712, the prediction performance function $V_N(\phi, Z^N)$ is minimized to find an optimal parameter vector $\hat{\theta}_N$ arg $\min_{\theta \in D_\mathcal{M}} V_N(\phi, Z^N)$. Any minimization procedure may be followed. The result of step 712 is a vector $\hat{\phi}_N$ of identified model parameters that tune the model $\mathcal{M}(\hat{\phi}_N)$ accurately predict system evolution multiple steps ahead. At step 714, the model identifier 412 provides the identified system model (i.e., $\mathcal{M}(\hat{\phi}_N)$) to the model predictive controller 414 for use in generating control inputs for the HVAC equipment 210.

According to various embodiments, process 700 is run once at set-up to establish the system model, run periodically to update the system model, or run repeatedly/continuously to dynamically update the system model in real time.

Experimental Results

To illustrate the advantages of the systems and methods described above, the following experimental results are included and shown in FIGS. 9-18. The HVAC system 100 and the building 10 were put through two experiments: a heating and a cooling experiment.

Heating Experiment

In the heating experiment, a simulated HVAC system 100 is in a heating mode to heat a simulated building 10. Because the system is simulated the actual values of the system parameters and the unmeasured time-varying disturbances ($\dot{Q}_{other}$) are known in the experiment for sake of comparison to the identified model.

To start, the controller 212 provides excitation signal to the HVAC equipment 210. The excitation signal 902 illustrated on graph 900 in FIG. 9 varies the temperature setpoint $T_{sp}$ using a pseudorandom binary signal that varies between the maximum and minimum allowable temperatures in the comfort zone ($T_{max}=25°$ C., $T_{min}=23°$ C.).

While the excitation signal is applied to the HVAC equipment 210, training data is collected and stored in the controller 212 for each time step k as described above. Each time step k in the heating experiment corresponds to five minutes of time (i.e., a data sample is recorded every five minutes). The training data is used by the system parameter identifier 418 to identify the model parameters as described above. In the heating experiment, the following results were found:

| Identified Parameters | Actual Parameters |
|---|---|
| $C_{ia, id}$ = 2.287037e+003 | $C_{ia}$ = 1.0448e+04 |
| $C_{s, id}$ = 3.2507187e+03 | $C_s$ = 3.4369e+05 |
| $R_{si, id}$ = 0.57426198230 | $R_{si}$ = 0.0863 |
| $R_{oi, id}$ = 0.69936 | $R_{oi}$ = 0.3302 |
| $\tau_{I, id}$ = 182.74 | $\tau_I$ = 180 |
| $K_{c, id}$ = 2.637 | $K_c$ = 12 |

The first step of model parameterization, carried out by the system parameter identifier 418, thereby determined the parameters to the correct order of magnitude, but some differences are present due to the time-varying disturbances (i.e., $\dot{Q}_{other}$).

Figure 10:
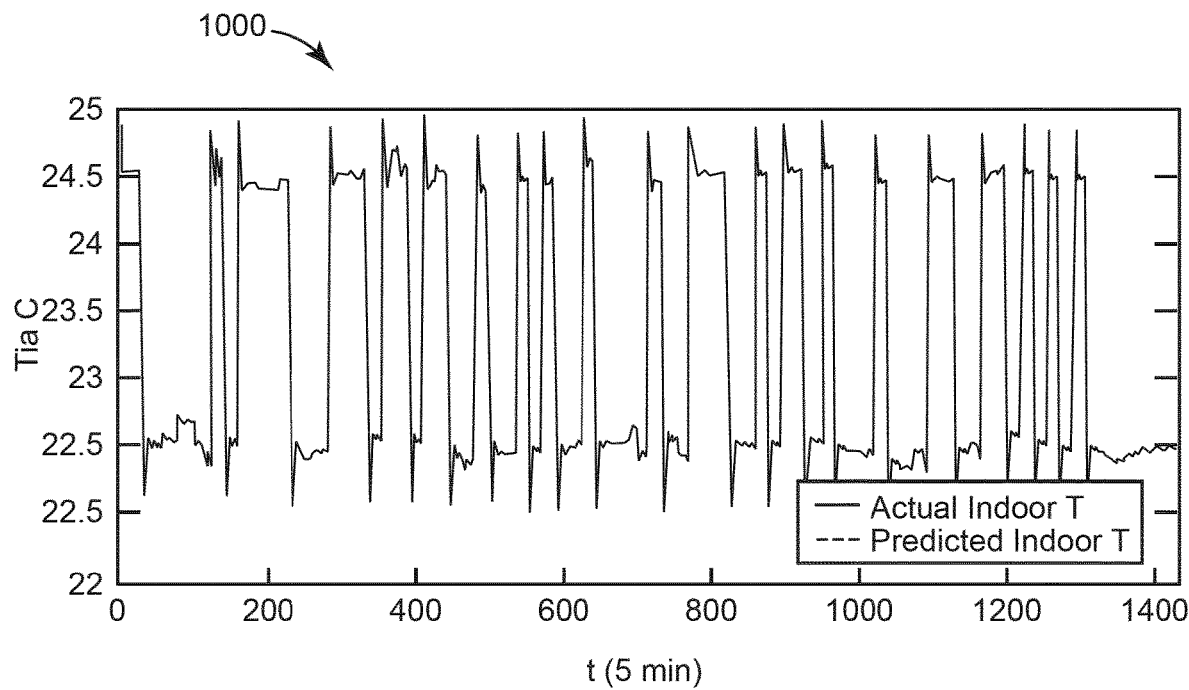
FIG. 10 is a first graph of results of the cooling experiment of FIG. 9, according to an example experiment.
Figure 11:
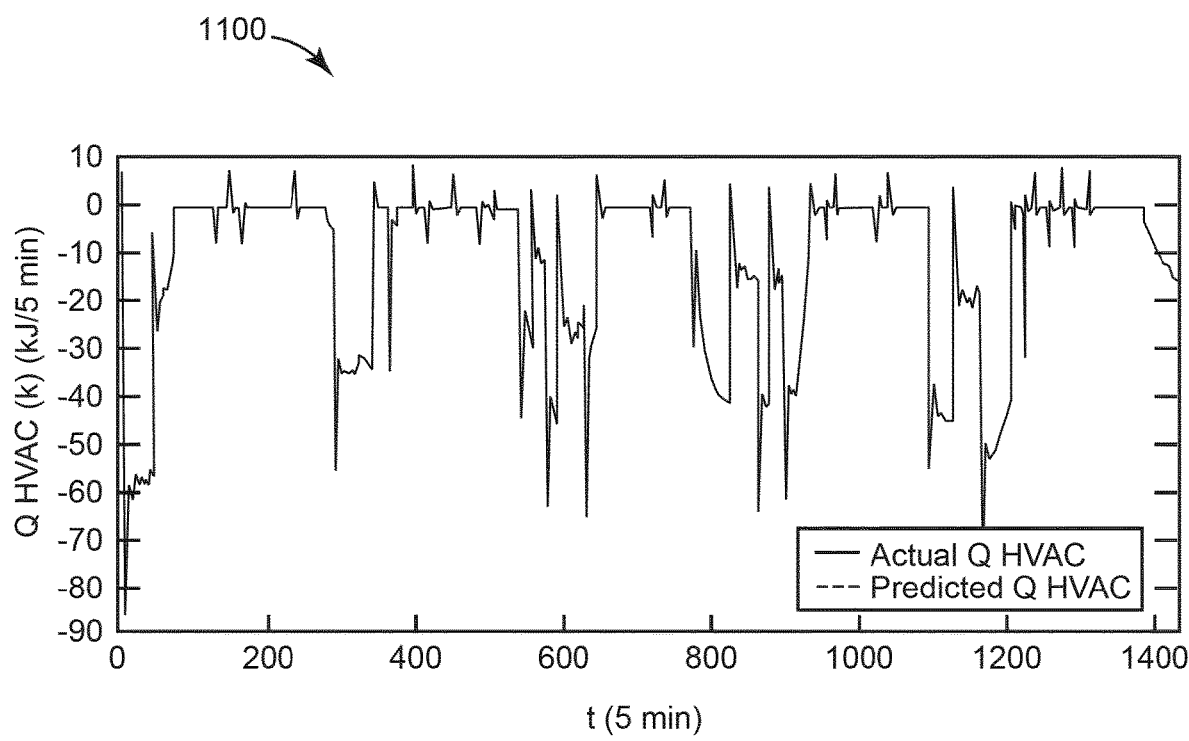
FIG. 11 is a second graph of results of the cooling experiment of FIG. 9, according to an example experiment.

Next, the Kalman gain parameters are identified by the gain parameter identifier 420. In the experiment, the gain parameters are identified using a one-step ahead prediction error method, a two-step ahead prediction error method, a five-step ahead prediction error method, a ten-step ahead prediction error method, and a fifty-step ahead prediction error method. As an example of the results, FIG. 10 shows a graph 1000 of the actual indoor temperature and the predicted indoor temperature over time as generated by the five-step ahead prediction error method. FIG. 11 shows a graph 1100 of the actual $\dot{Q}_{HVAC}$ and the predicted $\dot{Q}_{HVAC}$ over time as generated by the five-step ahead prediction error method. As shown in FIGS. 10 and 11, the predicted values of $T_{ia}$ and $\dot{Q}_{HVAC}$ consistently track the actual values.

The different number of steps (i.e., $h_{max}$ values) were included to allow comparison between the parameters identified using different numbers of steps. The Kalman gains identified using the various numbers of steps are presented in the following table:

| | 1-Step Kalman | | 2-Step Kalman | | 5-step Kalman | | 10-Step Kalman | | 50-Step Kalman | |
|---|---|---|---|---|---|---|---|---|---|---|
| | $T_{ia}$ | $Q_{HVAC}$ | $T_{ia}$ | $Q_{HVAC}$ | $T_{ia}$ | $Q_{HVAC}$ | $T_{ia}$ | $Q_{HVAC}$ | $T_{ia}$ | $Q_{HVAC}$ |
| $T_m$ | 4.4287 | 0.3367 | 3.570 | 0.5273 | 3.2643 | 0.3119 | 1.1435 | 0.4487 | −0.4660 | 0.1126 |
| $T_{ia}$ | 1.3442 | −0.0007 | 0.908 | −0.0098 | 0.6599 | −0.0128 | 0.4876 | −0.0188 | 0.1696 | −0.0826 |
| I | −125.5 | −110.8 | 62.25 | −105.345 | 73.984 | −110.048 | 172.649 | −105.768 | 78.550 | −74.3589 |
| d | −0.0008 | 0.0005 | −0.01 | 0.0003 | −0.0015 | 0.0004 | −0.0014 | 0.0003 | −0.0003 | 0.0001 |

Figure 12:
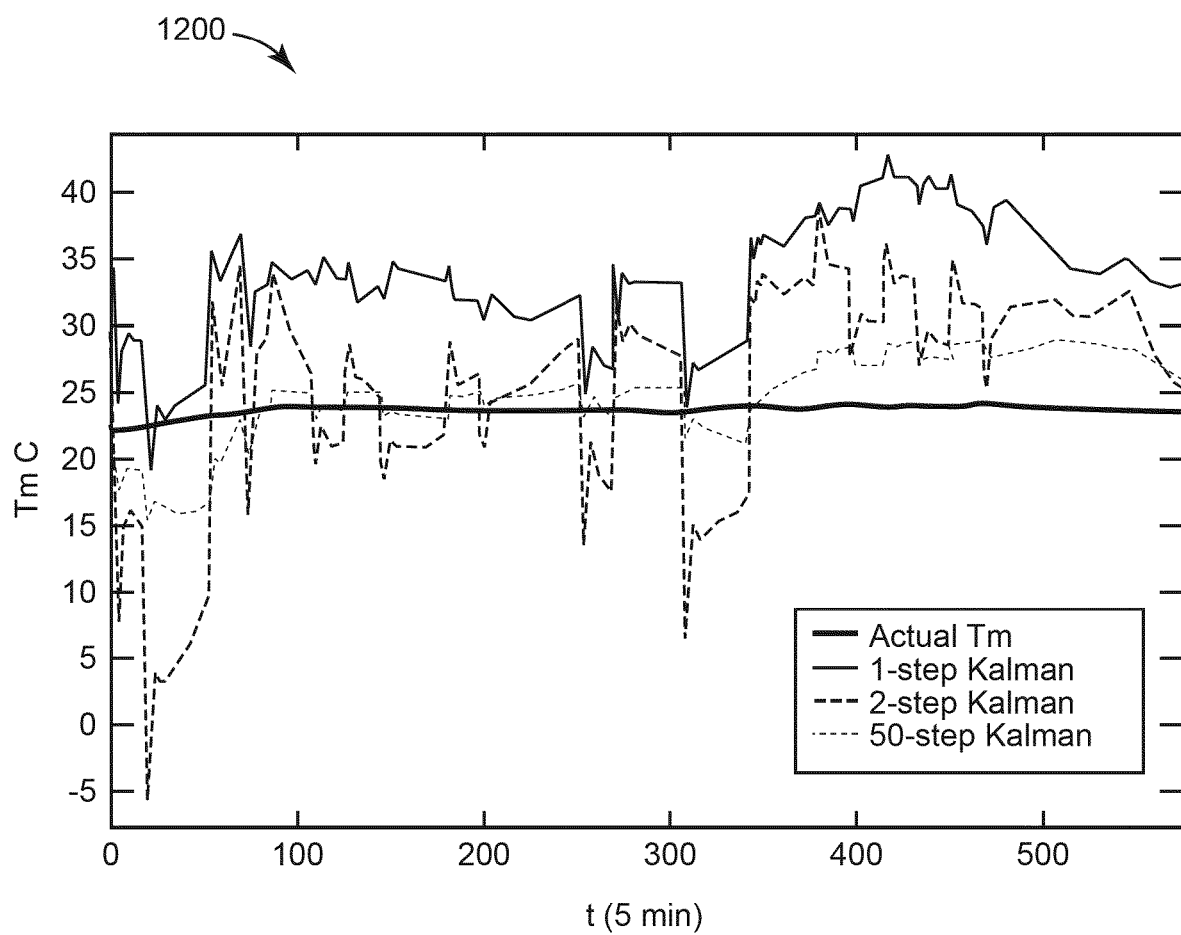
FIG. 12 is a third graph of results of the cooling experiment of FIG. 9, according to an example experiment.

FIG. 12 shows a graph 1200 of the estimated building mass temperature $T_m$ over time for the one-step prediction error method, the two-step prediction error method, and the fifty-step prediction error method, as well as the actual $T_m$ of the simulated building 10. As the number of steps increase, the $T_m$ estimates improve, following the actual $T_m$ line on graph 1200 closer.

Cooling Experiment

In the cooling experiment, a simulated HVAC system 100 is in a cooling mode to cool a simulated building 10. As above, because the system is simulated the actual values of the system parameters and the unmeasured time-varying disturbances ($\dot{Q}_{other}$) are known in the experiment for sake of comparison to the identified model.

Figure 13:
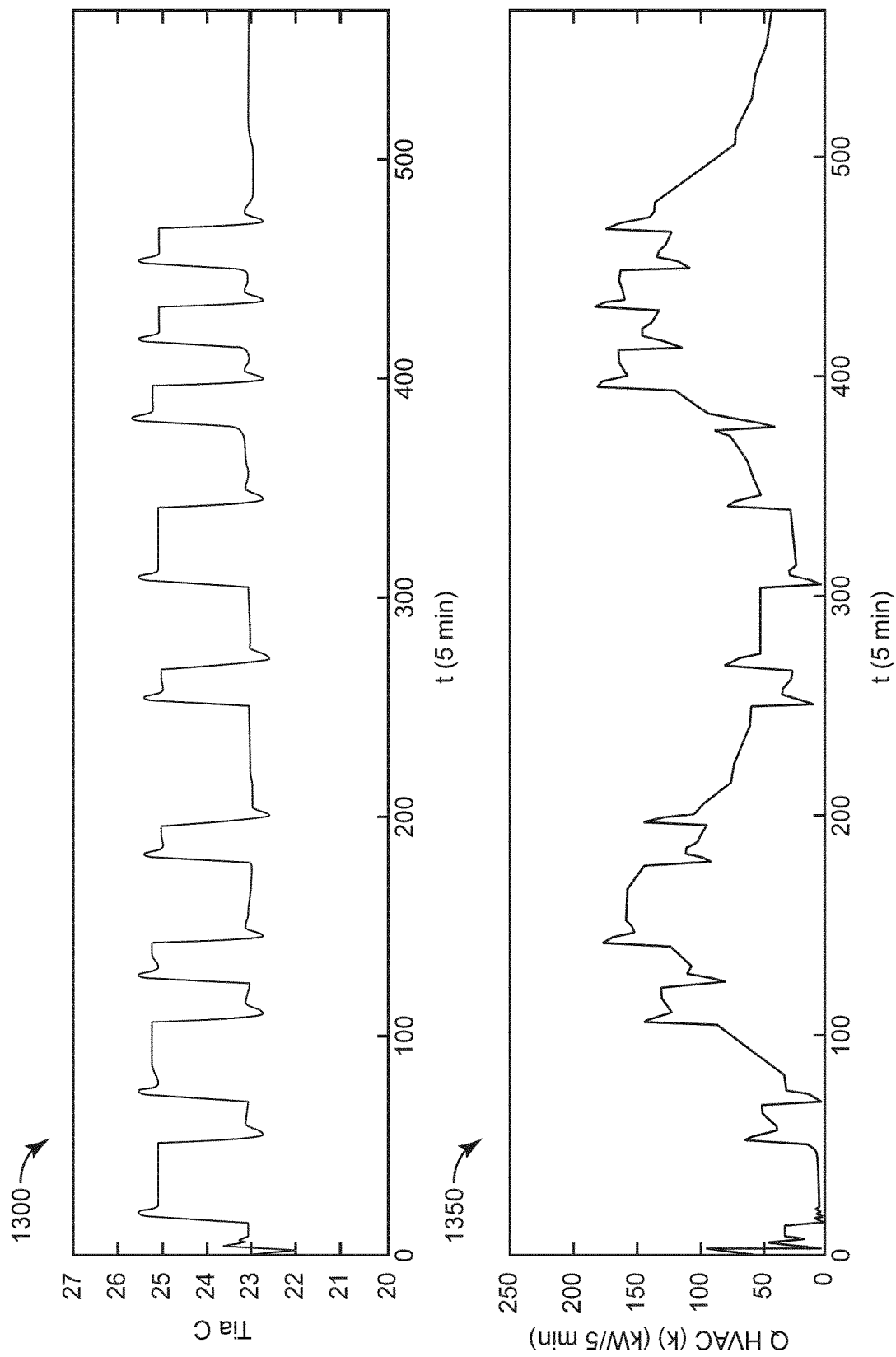
FIG. 13 is a first pair of graphs of results of a heating experiment that tests the controller of FIG. 4, according to an example experiment.
Figure 14:
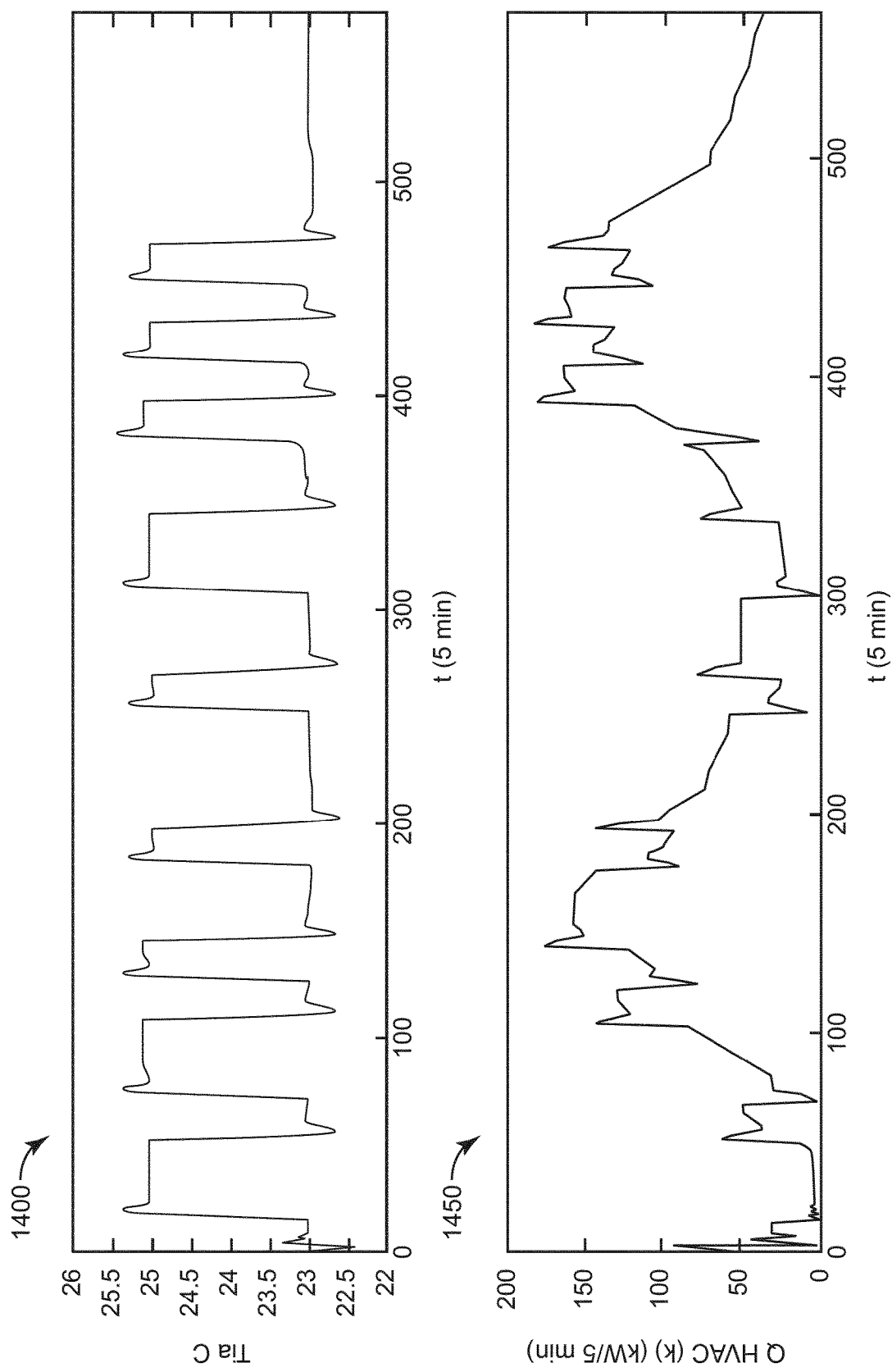
FIG. 14 is a second pair of graphs of results of the heating experiment of FIG. 13, according to an example experiment.

A similar procedure as the heating experiment is followed to generate models, with the Kalman gain generated using the multi-step prediction error method with a variety of number of steps (i.e., various prediction horizons $h_{max}$) (e.g., one step, two steps, eight steps, twelve steps, twenty steps). FIG. 13 shows output predictions generated using the one-step prediction error method compared to actual outputs, with $T_{ia}$ graphed over time on graph 1300 and $\dot{Q}_{HVAC}$ graphed over time on graph 1350. Similarly, FIG. 14 shows output predictions generated using the two-step prediction error method compared to actual outputs, with $T_{ia}$ graphed over time on graph 1400 and $\dot{Q}_{HVAC}$ graphed over time on graph 1450.

Figure 15:
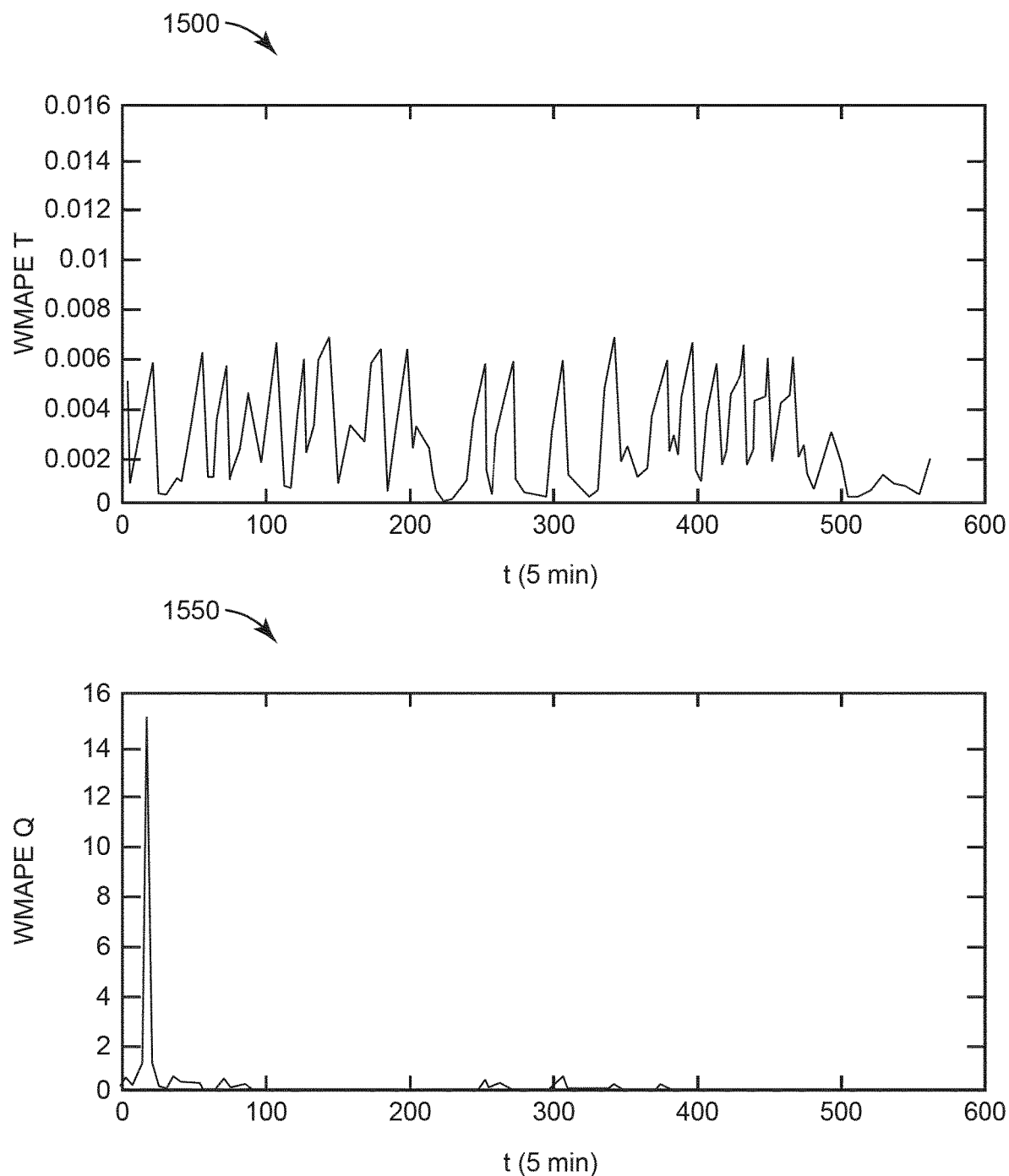
FIG. 15 is a third pair of graphs of results of the heating experiment of FIG. 13, according to an example experiment.

To compare the results of the various multi-step prediction error methods (i.e., various number of steps), several metrics are used. First, a weighted mean absolute prediction error (WMAPE) metric is an exponentially weighted average of the absolute prediction error at each time step and given by:

$$WMAPE(k) = \frac{\sum_{i=k}^{k+N_h-1} e^{-i/N_h}|y(i)-\hat{y}(i|k)|}{\sum_{i=k}^{k+N_h-1} e^{-i/N_h}}, k = 0, 1, 2, \ldots.$$

where $N_h \in \mathbb{I}_{>0}$ is the prediction horizon, $y(i)$ is the actual output at time step $i$ and $\hat{y}(i|k)$ is the predicted output with the identified model given a measurement at time step $k$ and the input sequence $u(k), u(k+1), \ldots, u(i-1)$. In the WMAPE equation, $y$ is used to refer to a scalar (i.e., one of the two outputs), and the WMAPE is computed separately for both outputs. The horizon used to calculate the WMAPE in the cooling experiment was twelve. FIG. 15 shows a graph 1500 of the WMAPE for Tia for the one-step ahead prediction error method and a 12-step ahead prediction error method for comparison. FIG. 15 also shows a graph 1550 of the WMAPE for $\dot{Q}_{HVAC}$ for the one-step ahead prediction error method and a 12-step ahead prediction error method for comparison.

Figure 16:
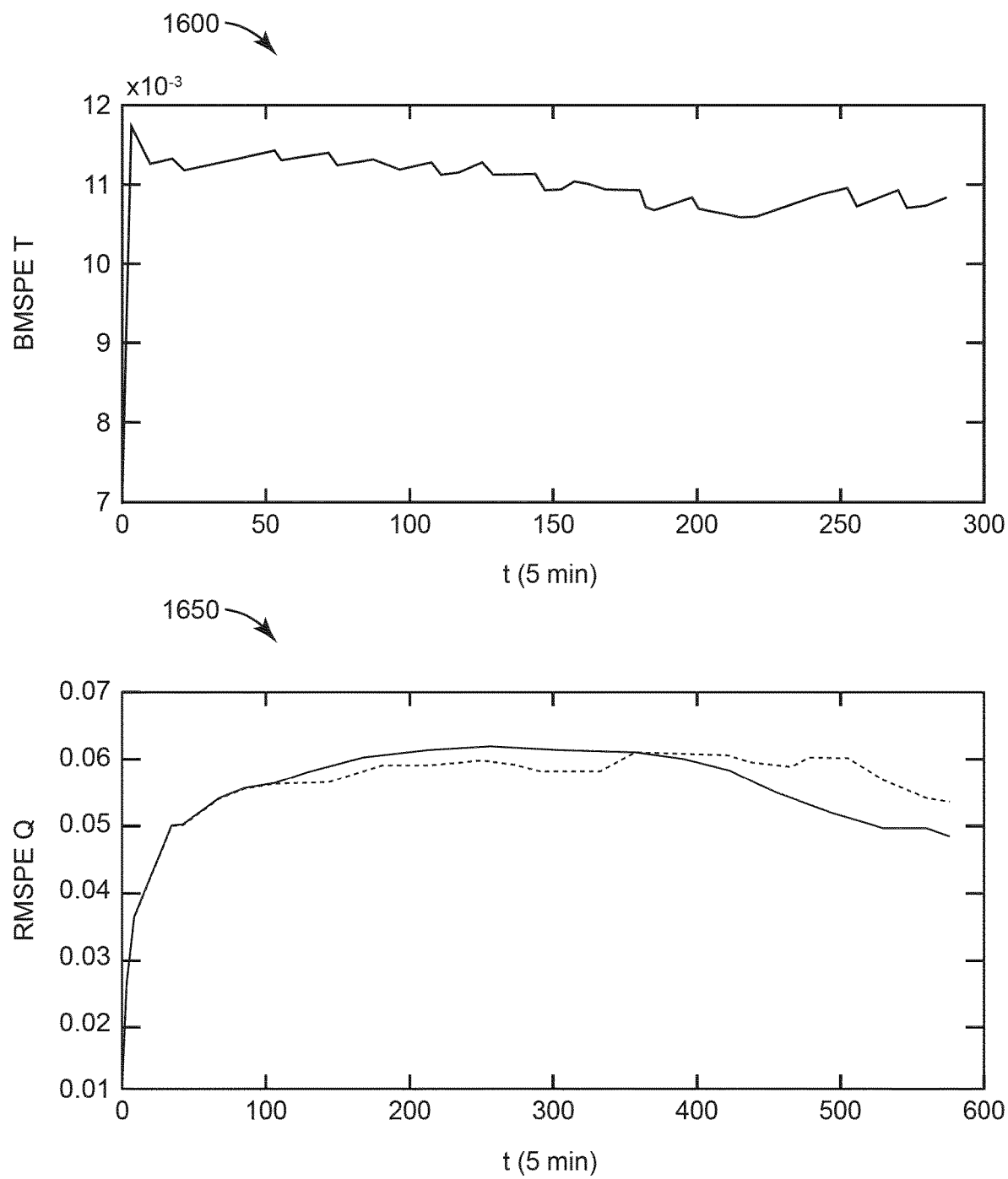
FIG. 16 is a fourth pair of graphs of results of the heating experiment of FIG. 13, according to an example experiment.

Another metric that can be used to evaluate the results of the cooling experiment is the root mean squared prediction error (RMSPE). RMSPE is calculated for a range of values of $q$ from zero-step ahead prediction up to $N_h$-step ahead prediction. That is, given a set of measured output values $\{y(0), \ldots, y(M)\}$ for $M \in \mathbb{I}_{\geq 0}$, the RMSPE is given by:

$$RMSPE(q) = \sqrt{\frac{\sum_{i=q+1}^{M}(y(i)-\hat{y}(i|i-q))^2}{M-q}}$$

for all $q \in \{0, \ldots, N_h-1\}$. The RMSPE helps identify the prediction error over the prediction horizon. In the example here, the RMSPE is calculated for 288 steps (i.e., $N_h$=288). FIG. 16 shows a graph 1600 of the RMSPE for $T_{ia}$ for the one-step ahead prediction error method and a two-step ahead prediction error method for comparison. FIG. 16 also shows a graph 1650 of the WMAPE for $\dot{Q}_{HVAC}$ for the one-step ahead prediction error method and the two-step ahead prediction error method for comparison.

Figure 17:
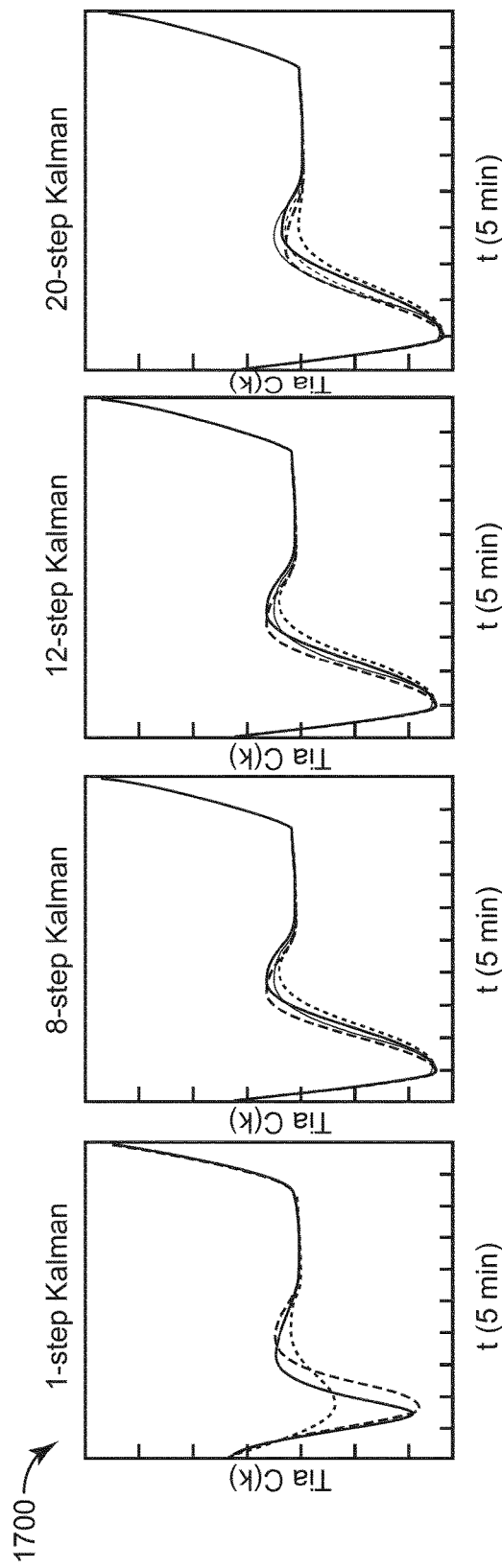
FIG. 17 is a first visualization comparing various results of the heating experiment of FIG. 13, according to an example experiment.
Figure 18:
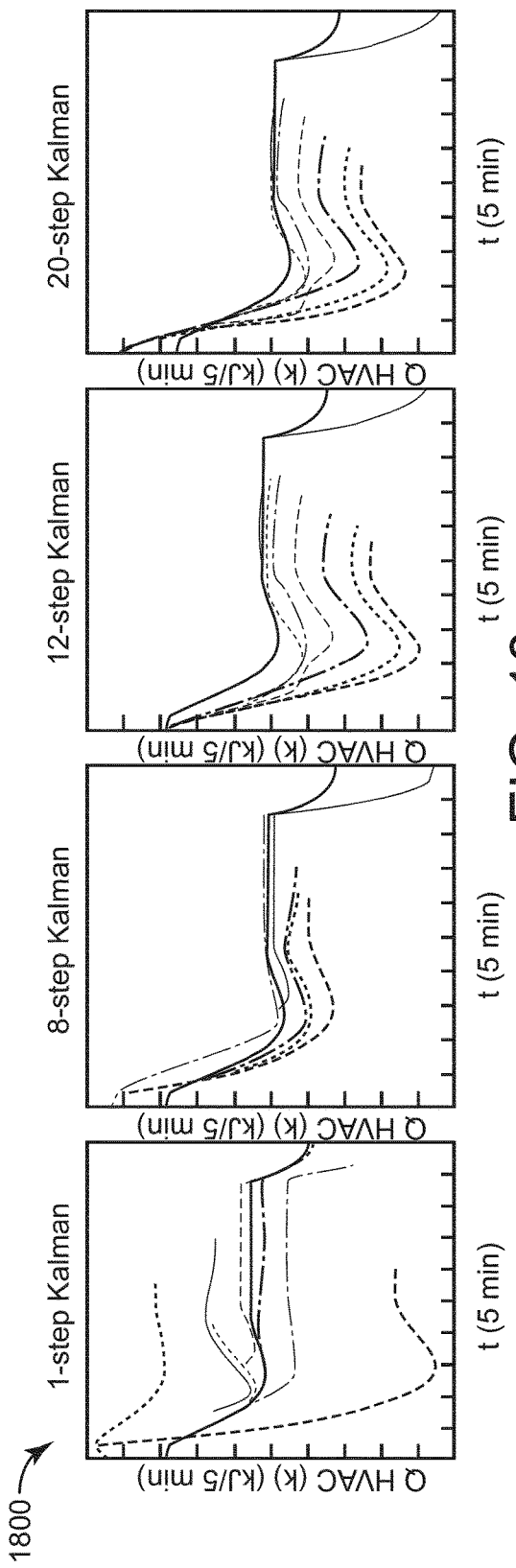
FIG. 18 is a second visualization comparing various results of the heating experiment of FIG. 13, according to an example experiment.

A third way to compare across different numbers of steps is to visualize the power of prediction. FIG. 17 and FIG. 18 shows examples visualizations 1700 and 1800 of this third metric. To generate the visualizations 1700, 1800, ten lines of N-steps-ahead predictions are plotted using the Kalman gain generated by each multi-step ahead prediction method. That is, a first line starts x0 (i.e., an initial state) and plots the N step ahead prediction, from $\hat{x}(1|0)$ all the way to $\hat{x}(N|0)$. The second line takes $\hat{x}(1|0)$ and plots N steps ahead, and so on, until ten lines are plotted. The closer the lines are to being on top of each other, the better the output multi-step prediction. In the examples of FIGS. 15 and 16, the lines are plotted for twelve steps ahead (N=12).

The visualization 1700 of FIG. 17 is thereby generated for each of the one-step ahead prediction error method, the eight-step ahead prediction error method, the twelve-step ahead prediction error method, the twenty-step ahead prediction error method for the output $T_{ia}$. The visualization 1800 of FIG. 18 is generated in the same way for each of the one-step ahead prediction error method, the eight-step ahead prediction error method, the twelve-step ahead prediction error method, the twenty-step ahead prediction error method for the output $\dot{Q}_{HVAC}$.

In both visualization 1700 and visualization 1800, the eight-step prediction error method is shown to have the best results (i.e., the lines are plotted closest together), even though the lines were plotted twelve steps ahead. Thus, in some embodiments, an eight-step ahead prediction error method may be preferred (i.e., $h_{max}$=7). Because each time step is five minutes in the experiment, this implies that a prediction horizon of forty minutes in the Kalman gain identification is well suited for generating a model that predicts one hour (12 steps) into the future.

Triggered Feedback Setpoint Signal for Persistent Excitations of System Dynamics Overview Referring generally to FIGS. 19-26, systems and method for maintaining persistent excitations in an HVAC system are shown, according to some embodiments. Before performing a system identification process to generate a predictive model, training data should be gathered. The accuracy and content of the training data can be critical for generating a predictive model that is reflective of true system dynamics. However, due to actuator saturation, the training data gathered may be inaccurate, include data not rich in content, etc. If bad (inaccurate, insufficient, etc.) training data is utilized in the system identification process, the predictive model may be inaccurate which can result in various issues for control processes that utilize the predictive model.

To mitigate an impact of actuator saturation on the system identification process and to ensure the training data includes data that accurately reflects system dynamics, the HVAC system can be operated based on a commanded setpoint that is adjusted as needed to reduce an amount of time the HVAC system spends in saturation conditions. The HVAC system and environmental conditions can be monitored to determine if the HVAC system is operating in saturation. If a determination is made that the HVAC system is operating in saturation, the commanded setpoint can be adjusted to drive the HVAC system out of saturation conditions. In some embodiments, the learning period during which the training data is gathered occurs for a limited duration of time prior to a system identification process being performed.

In some embodiments, data generation and gathering via persistent excitations is performed by a local controller(s) of an HVAC system. The local controller(s) can ensure that HVAC equipment is appropriately controlled to maintain persistent excitations and avoid saturation regions for as much of a learning period as possible. However, a system identification process to generate a predictive model based on the collected data can be handled remotely. For example, the system identification process can be performed by a cloud server, a remote desktop computer, etc. In some embodiments, the local controllers of the HVAC are configured to perform the system identification process.

Environmental Control System with Persistent Excitation of HVAC Dynamics

Figure 19:
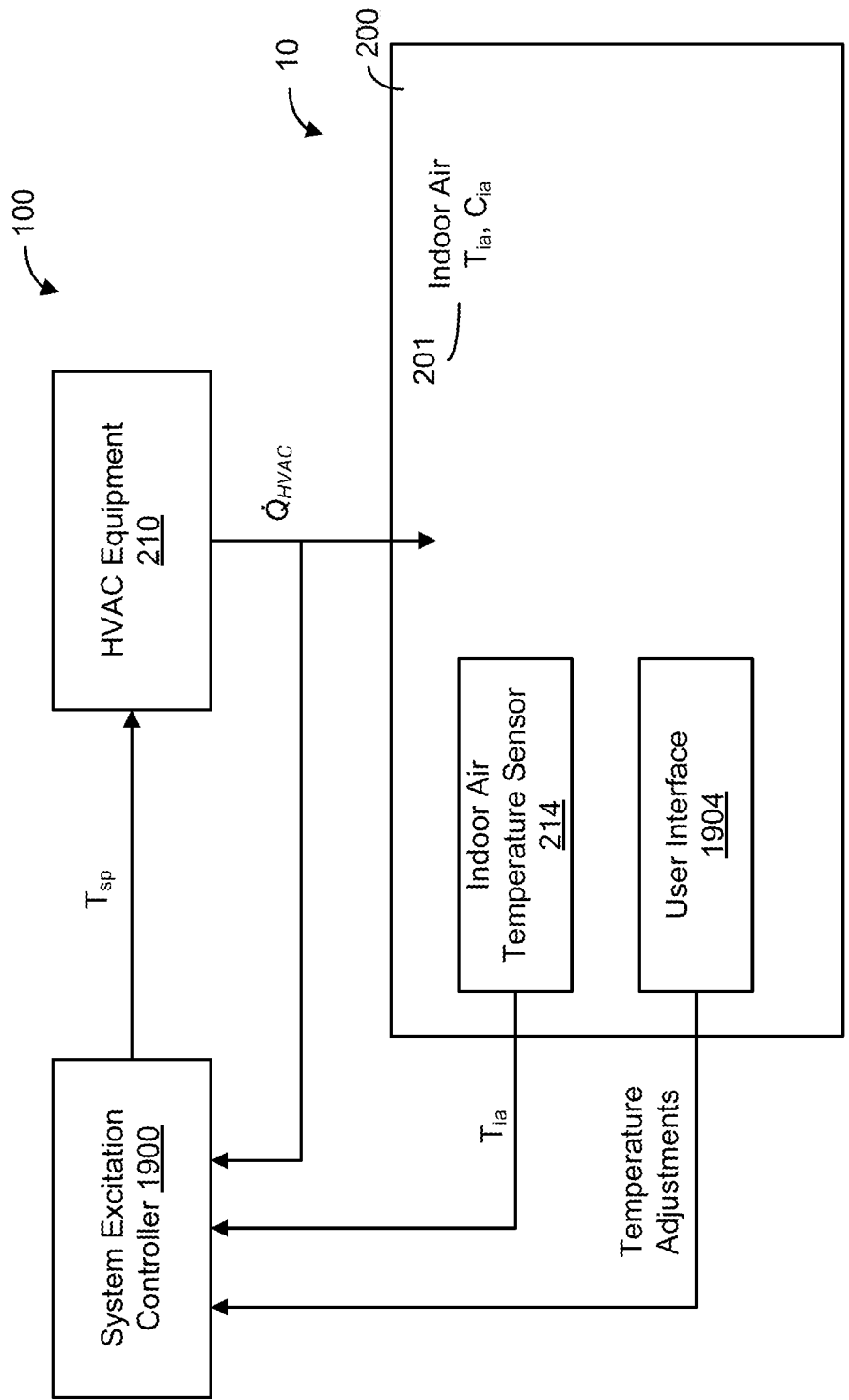
FIG. 19 is an alternative configuration of the building and HVAC system of FIG. 2 including a system excitation controller, according to some embodiments.

Referring now to FIG. 19, an alternative configuration of building 10 and HVAC system 100 of FIG. 2 is shown, according to some embodiments. HVAC system 100 is shown to include a system excitation controller 1900. In some embodiments, system excitation controller 1900 includes some and/or all of the functionality of controller 212 described with reference to FIGS. 2, 4, and 5. System excitation controller 1900 is shown to receive an indoor air temperature $T_{ia}$ of zone 200 from indoor air temperature sensor 214. System excitation controller 1900 is also shown to receive $\dot{Q}_{HVAC}$ from HVAC equipment 210.

To maintain persistent excitation of HVAC dynamics during a learning period in which training data is gathered, system excitation controller 1900 can monitor a temperature tracking error and corresponding values of $\dot{Q}_{HVAC}$. The temperature tracking error can be defined as a difference between an indoor air temperature $T_{ia}$ and a temperature setpoint $T_{sp}$ provided to HVAC equipment 210. Mathematically, the temperature tracking error can be defined as $T_{sp}-T_{ia}$. As values of $T_{sp}$ change, operation of HVAC equipment 210 can adjust to drive $T_{ia}$ towards a value of $T_{sp}$. In response, values of $\dot{Q}_{HVAC}$ can be compared against the temperature tracking error to determine if $\dot{Q}_{HVAC}$ is in a saturation region. If $\dot{Q}_{HVAC}$ is determined to be in saturation, system excitation controller 1900 can adjust values of $T_{sp}$ in a direction to help drive $\dot{Q}_{HVAC}$ out of the saturation region. Throughout monitoring of the temperature tracking error and corresponding values of $\dot{Q}_{HVAC}$, training data can be collected and saved by system excitation controller 1900 and/or controller 212 for use in system identification. The training data can include any data pertinent to system identification and generation of a predictive model. For example, the training data can include values of $\dot{Q}_{HVAC}$, $T_{ia}$, $T_{sp}$, external weather conditions, environmental condition data, etc. By adjusting values of $T_{sp}$ to help drive $\dot{Q}_{HVAC}$ out of saturation regions, the training data gathered over the learning period can be reflective of true system dynamics and can be overall rich in content (e.g., a large variety of $\dot{Q}_{HVAC}$ values are included), such that a highly-accurate system model may be identified using such training data.

System excitation controller 1900 is also shown to receive temperature adjustments from a user interface 1904. User interface 1904 can be any interface configured to communicate temperature adjustments to system excitation controller 1900. For example, user interface 1904 can be implemented as a mobile device application, a command-line terminal in a building, a website application, a display device, a touchscreen, a thermostat, etc. In some embodiments, user interface 1904 communicates with system excitation controller 1900 either through a direct connection (e.g., local wired or wireless communications) or via a communications network (e.g., a wide area network, the Internet, a cellular network, etc.). During the learning period in which training data is being gathered via persistent excitation of HVAC dynamics, temperatures of zone 200 may fluctuate beyond comfortable values to occupants. If the temperature of zone 200 becomes uncomfortable, an occupant can indicate a desired temperature adjustment of zone 200 via user interface 1904. To ensure occupant comfort is appropriately maintained during the learning period, system excitation controller 1900 can constrain $T_{sp}$ to a smaller range of possible values as compared to a situation in which system excitation controller 1900 prioritizes data gathering by permitting values of $T_{sp}$ that may be uncomfortable to occupants.

Based on desired temperature adjustments received from user interface 1904, system excitation controller 1900 can determine time periods during the learning period in which occupant comfort should be prioritized and time periods during the learning period in which occupant comfort is not a priority. Depending on an importance of occupant comfort, values of $T_{sp}$ can be constrained to varying ranges of values. In general, more accurate training data can be gathered as a range of permissible values of $T_{sp}$ increases, as saturation conditions can be more easily be avoided. As such, it can be advantageous to limit a duration of time periods when occupant comfort is prioritized. For example, in a commercial building, system excitation controller 1900 can ensure values of $T_{sp}$ are comfortable to occupants (e.g., based on the desired temperature adjustments) only during working times (e.g., 9a.m.-5p.m. on weekdays). At other times, for example during the night and on weekends, permissible values of $T_{sp}$ can be broadened such that training data can be gathered that is more representative of system dynamics.

Alternatively, system excitation controller 1900 can ignore desired temperature adjustments received from user interface 1904 during the learning period to maximize quality of the training data gathered. In some embodiments, if the desired temperature adjustments are ignored, values of $T_{sp}$ can vary within wider bounds as compared to if occupant comfort is prioritized. Advantageously, as the learning period may only occur for a limited amount of time (e.g., 2 days, a week, etc.), occupants can be notified ahead of the learning period that temperature fluctuations may occur temporarily. If the learning period is successful in gathering representative training data, a predictive model can be generated via system identification that can maintain occupant comfort after the learning period. By ignoring the desired temperature adjustments, more accurate training data can be gathered and/or a duration of the learning period can be reduced. System excitation controller 1900 is described in greater detail below with reference to FIG. 20.

Figure 20:
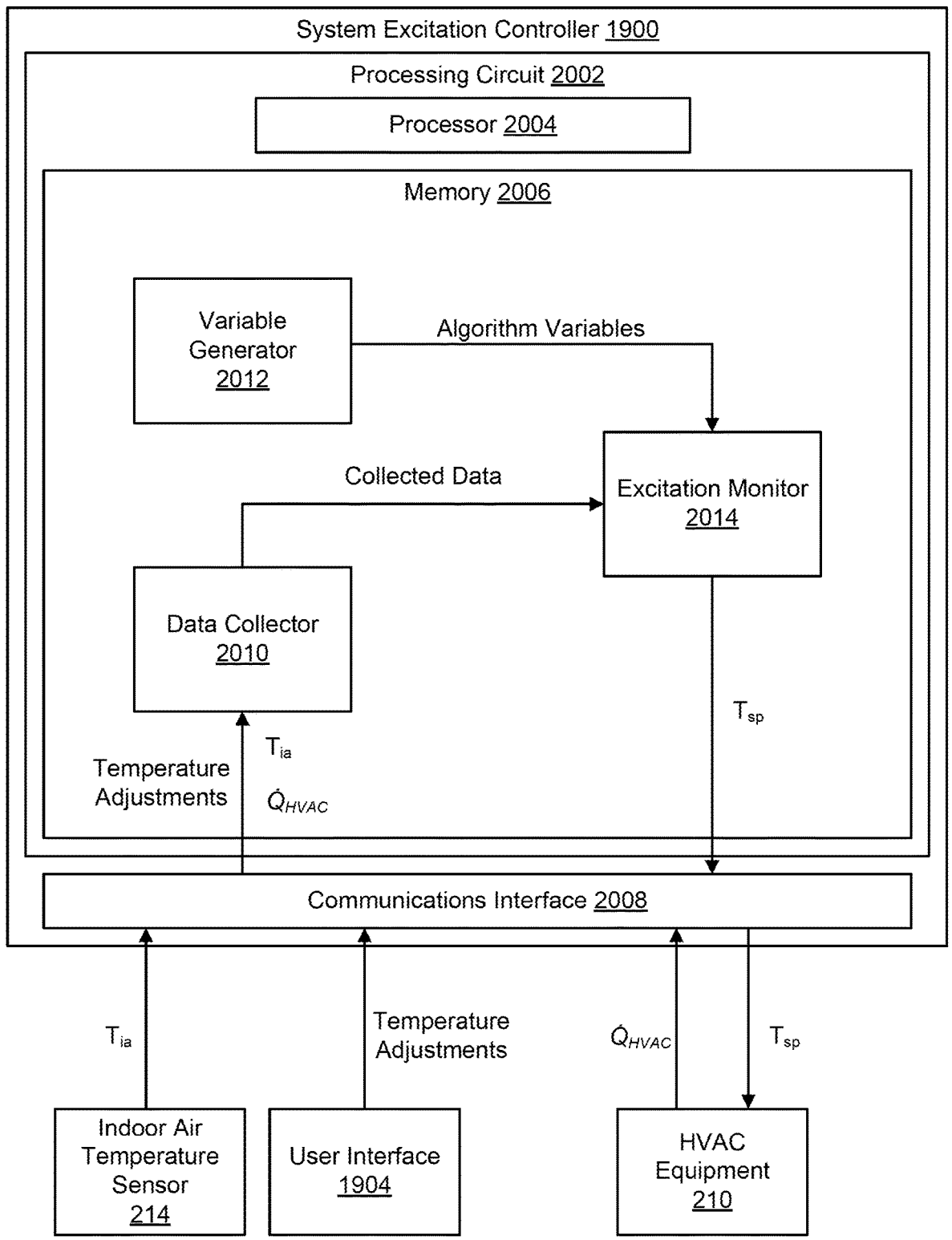
FIG. 20 is a block diagram of the system excitation controller of FIG. 19 in greater detail including a variable generator, according to some embodiments.

Referring now to FIG. 20, system excitation controller 1900 is shown in greater detail, according to some embodiments. System excitation controller 1900 is shown to include a communications interface 2008 and a processing circuit 2002. Communications interface 2008 may include wired or wireless interfaces (e.g., jacks, antennas, transmitters, receivers, transceivers, wire terminals, etc.) for conducting data communications with various systems, devices, or networks. For example, communications interface 2008 may include an Ethernet card and port for sending and receiving data via an Ethernet-based communications network and/or a Wi-Fi transceiver for communicating via a wireless communications network. Communications interface 2008 may be configured to communicate via local area networks or wide area networks (e.g., the Internet, a building WAN, etc.) and may use a variety of communications protocols (e.g., BACnet, IP, LON, etc.).

Communications interface 2008 may be a network interface configured to facilitate electronic data communications between system excitation controller 1900 and various external systems or devices (e.g., indoor air temperature sensor 214, user interface 1904, HVAC equipment 210, etc.). For example, system excitation controller 1900 may receive a temperature of zone 200 from indoor air temperature sensor 214 via communications interface 1908. In some embodiments, communications interface 2008 is configured to provide a temperature setpoint $T_{sp}$ to HVAC equipment 210.

Still referring to FIG. 20, processing circuit 2002 is shown to include a processor 2004 and memory 2006. Processor 2004 may be a general purpose or specific purpose processor, an application specific integrated circuit (ASIC), one or more field programmable gate arrays (FPGAs), a group of processing components, or other suitable processing components. Processor 2004 may be configured to execute computer code or instructions stored in memory 2006 or received from other computer readable media (e.g., CDROM, network storage, a remote server, etc.).

Memory 2006 may include one or more devices (e.g., memory units, memory devices, storage devices, etc.) for storing data and/or computer code for completing and/or facilitating the various processes described in the present disclosure. Memory 2006 may include random access memory (RAM), read-only memory (ROM), hard drive storage, temporary storage, non-volatile memory, flash memory, optical memory, or any other suitable memory for storing software objects and/or computer instructions. Memory 2006 may include database components, object code components, script components, or any other type of information structure for supporting the various activities and information structures described in the present disclosure. Memory 2006 may be communicably connected to processor 2004 via processing circuit 2002 and may include computer code for executing (e.g., by processor 2004) one or more processes described herein. In some embodiments, one or more components of memory 2006 are part of a singular component. However, each component of memory 2006 is shown independently for ease of explanation.

Memory 2006 is shown to include a data collector 2010. Data collector 2010 is shown to receive temperature adjustments from user interface 1904, an indoor air temperature Tia from indoor air temperature sensor 214, and a heat transfer value $\dot{Q}_{HVAC}$ from HVAC equipment 210 via communications interface 2008. Data collector 2010 is shown to provide collected data to an excitation monitor 2014. In some embodiments, data collector 2010 stores various collected data for use in system identification, for example data points for each time step in the learning period (e.g., every fifteen minutes). As such, data collector 2010 can include some and/or all of the functionality of training data generator 408 and/or training data database 410.

Memory 2006 is also shown to include a variable generator 2012. Variable generator 2012 can generate some and/or all algorithm variables required by excitation monitor 2014 to determine if $\dot{Q}_{HVAC}$ is in saturation. Variable generator 2012 is described in greater detail below with reference to FIG. 21.

Figure 21:
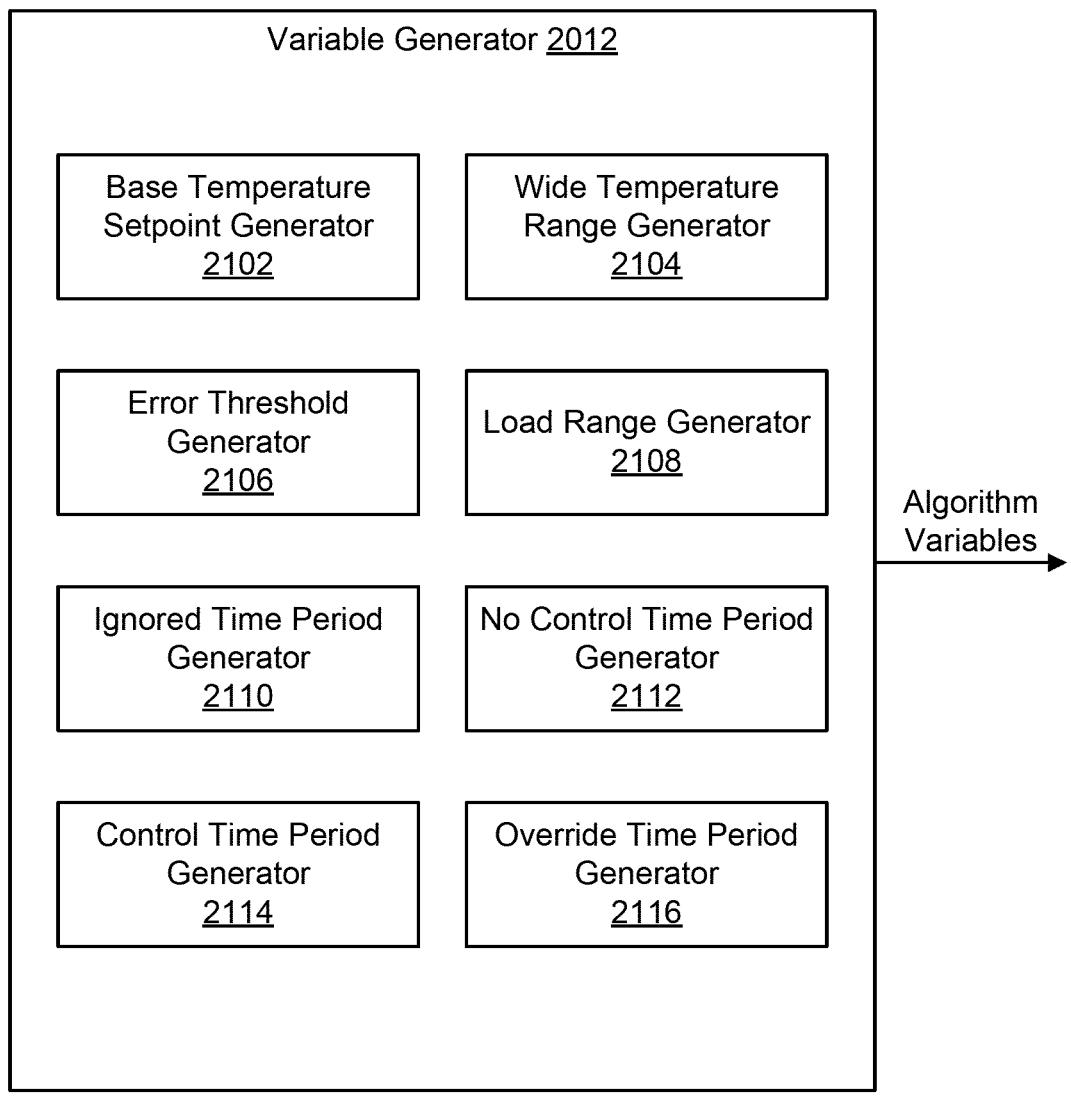
FIG. 21 is the variable generator of FIG. 20 in greater detail, according to some embodiments.

Referring now to FIG. 21, variable generator 2012 is shown in greater detail, according to some embodiments. Variable generator 2012 is shown to include a base temperature setpoint generator 2102. Base temperature setpoint generator 2102 can define a maximum base temperature $T_{Base_{max}}$ and a minimum base temperature $T_{Base_{min}}$ for a base temperature excitation setpoint signal. In some embodiments, if $\dot{Q}_{HVAC}$ is not in a saturation region, $T_{sp}$ may alternate between $T_{Base_{max}}$ and $T_{Base_{min}}$ based on the base temperature excitation setpoint signal. In some embodiments, $T_{Base_{max}}$ and $T_{Base_{min}}$ act as soft constraints on permissible values of setpoint temperature $T_{sp}$ provided to HVAC equipment 210. As soft constraints, $T_{sp}$ can be determined to be within a range set by $T_{Base_{max}}$ and $T_{Base_{min}}$ if $\dot{Q}_{HVAC}$ is not in a saturation region. However, if $\dot{Q}_{HVAC}$ is in a saturation region, $T_{sp}$ may take on a value equal to or above $T_{Base_{max}}$ and/or equal to or below $T_{Base_{min}}$.

Variable generator 2012 is also shown to include a wide temperature range generator 2104. Wide temperature range generator 2104 can define a wider temperature range equal to or beyond bounds set by $T_{Base_{max}}$ and $T_{Base_{min}}$. Particularly, wide temperature range generator 2104 can define a maximum temperature value $T_{Wide_{max}}$ equal to or greater than $T_{Base_{max}}$ and a minimum temperature $T_{Wide_{min}}$ equal to or less than $T_{Base_{min}}$. In some embodiments, $T_{Wide_{max}}$ and $T_{Wide_{min}}$ act as hard constraints on permissible values of $T_{sp}$. In other words, $T_{Wide_{max}}$ and $T_{Wide_{min}}$ can define maximum and minimum permissible values of $T_{sp}$ respectively. In some embodiments, values of $T_{Wide_{max}}$ and $T_{Wide_{min}}$ are time varying (i.e., $T_{Wide_{max}}(t)$ and $T_{Wide_{min}}(t)$). Wide temperature range generator 2104 can determine $T_{Wide_{max}}$ and $T_{Wide_{min}}$ to be time varying if, for example, values of $T_{sp}$ are to be comfortable for occupants during certain portions of a day. For example, a difference between $T_{Wide_{max}}$ and $T_{Wide_{min}}$ may decrease during working hours and increase while occupants are not expected to be present. In general, as a difference between $T_{Wide_{max}}$ and $T_{Wide_{min}}$ increases, a broader range of permissible values of $T_{sp}$ can be determined, thereby allowing greater flexibility in helping to move $\dot{Q}_{HVAC}$ out of saturation if saturation conditions are present.

Variable generator 2012 is also shown to include an error threshold generator 2106. Error threshold generator 2106 can define a temperature tracking error threshold $e_{threshold}$. $e_{threshold}$ can be utilized as a comparison value for the temperature tracking error by excitation monitor 2014 to determine how $T_{sp}$ should be adjusted. Similar to $T_{Wide_{max}}$ and $T_{Wide_{min}}$, $e_{threshold}$ can be potentially time varying (i.e., $e_{threshold}(t)$).

Variable generator 2012 is also shown to include a load range generator 2108. Load range generator 2108 can generate two ranges of $\dot{Q}_{HVAC}$ that are considered to be in saturation. In some embodiments, a first range generated by load range generator 2108 is a small range around a minimum $\dot{Q}_{HVAC}$ that can be supplied. The minimum $\dot{Q}_{HVAC}$ that can be supplied can be understood as a minimum level of operation HVAC equipment 210 can operate at without being shut down. The small range around the minimum $\dot{Q}_{HVAC}$ can be defined as a low loads range Rio. Similarly, a second range around a maximum $\dot{Q}_{HVAC}$ that can be supplied can be defined as a high loads range $R_{high}$. The maximum $\dot{Q}_{HVAC}$ can be understood as a maximum operating level of HVAC equipment 210.

Variable generator 2012 is also shown to include an ignored time period generator 2110. Ignored time period generator 2110 can define a time period $T_{ignore}$ after an adjustment to $T_{sp}$ in which the temperature tracking error is ignored. In some embodiments, $T_{ignore}$ is utilized as changes to indoor air temperature $T_{ia}$ are not immediate after $T_{sp}$ is adjusted. For example, $T_{ignore}$ can be defined as the first 10 minutes after a value of $T_{sp}$ changes to allow $T_{ia}$ some time to adjust.

Variable generator 2012 is also shown to include a no control time period generator 2112. No control time period generator 2112 can define a time period $T_{Saturation_{NoControl}}$ during which the temperature tracking error should not exceed $e_{threshold}$ while $\dot{Q}_{HVAC}$ is entirely within $R_{low}$ or $R_{high}$. In other words, $$T_{Saturation_{NoControl}}$$

defines a period of time where HVAC equipment 210 is under saturation and is not able to control the temperature of zone 200 to a desired setpoint (i.e., $T_{sp}$). For example, if a current temperature in zone 200 is 24° C. and a desired temperature is 26° C. but HVAC equipment 210 is in a cooling mode, said change to the desired temperature cannot be achieved through operation of HVAC equipment 210. As such, HVAC system 100 can be considered in saturation and not under control. In some embodiments, $$T_{Saturation_{NoControl}}$$

indicates a time period that has incorrect mappings between setpoints and corresponding values of $\dot{Q}_{HVAC}$. Likewise, if a time period defined by $$T_{Saturation_{NoControl}}$$

occurs, the gathered training data during the time period may lack richness in content as there is no persistent excitations of inputs to outputs.

Variable generator 2012 is also shown to include a control time period generator 2114. Control time period generator 2114 can define a time period $T_{Saturation_{Control}}$ in which HVAC should not be entirely within $R_{low}$ or $R_{high}$ even if the temperature tracking error does not exceed $e_{threshold}$. In other words, $T_{Saturation_{Control}}$ defines a time period in which HVAC equipment 210 is under saturation but is able to control the temperature to the desired setpoint. In some embodiments, $T_{Saturation_{Control}}$ is strictly greater than or equal to $$T_{Saturation_{NoControl}}$$

During $T_{Saturation_{Control}}$, data generated can have correct mappings between setpoints and corresponding values of $\dot{Q}_{HVAC}$. For example, if a current temperature of zone 200 is 24° C. and a desired temperature of zone 200 is also 24° C., HVAC equipment 210 can be shut off as the desired temperature is reached. In this case, HVAC system 100 is under saturation but is controlled. However, behavior defined by $T_{Saturation_{Control}}$ should not dominate the training data as a more accurate predictive model can be generated if a variety of $\dot{Q}_{HVAC}$ values that excite all critical system dynamics are captured. Particularly, the variety of HVAC values can allow the training data to capture more zone temperature dynamics, building mass temperature dynamics, and $\dot{Q}_{HVAC}$ dynamics than a limited set of $\dot{Q}_{HVAC}$ values.

Variable generator 2012 is also shown to include an override time period generator 2116. Override time period generator 2116 can define a minimum time duration of temperature setpoint overrides $T_{Override_{min}}$. $T_{Override_{min}}$ can represent a minimum amount of time that a setpoint remains at a certain value after being adjusted based on a feedback algorithm solved by excitation monitor 2014. $T_{Override_{min}}$ can ensure $T_{sp}$ is not rapidly adjusted as rapid adjustment may not allow $\dot{Q}_{HVAC}$ sufficient time to adjust to changes in $T_{sp}$, thereby jeopardizing quality of the training data.

Referring again to FIG. 20, variable generator 2012 is shown to provide the algorithm variables to excitation monitor 2014. Based on the algorithm variables and the collected data, excitation monitor 2014 can solve the feedback algorithm to determine an appropriate value of $T_{sp}$ to provide to HVAC equipment 210. In some embodiments, excitation monitor 2014 includes some and/or all functionality of equipment controller 416.

To generate training data rich in content, excitation monitor 2014 can start the learning period by commanding $T_{sp}$ based on a base temperature excitation setpoint signal that alternates between $T_{Base_{max}}$ and $T_{Base_{min}}$. The base temperature excitation setpoint signal can be, for example, a pseudorandom binary signal (PRBS), a Random Gaussian Signal (RGS), or a different signal for adjusting values of $T_{sp}$. At the start of the learning period, excitation monitor 2014 can also monitor the temperature tracking error (i.e., $T_{sp}-T_{ia}$) and track corresponding values of $\dot{Q}_{HVAC}$.

After a change to $T_{sp}$, the temperature tracking error can be ignored by excitation monitor 2014 for an amount of time defined by $T_{ignore}$. In this way, some and/or all of an amount of time $T_{ia}$ takes to adjust to a change in $T_{sp}$ is not accounted for in the temperature tracking error. For example, $T_{ignore}$ can be equal to 10 minutes such that the temperature tracking error is not tracked by excitation monitor 2014 for 10 minutes following an adjustment to $T_{sp}$.

Throughout the learning period, excitation monitor 2014 can monitor $\dot{Q}_{HVAC}$ to ensure $\dot{Q}_{HVAC}$ is not in a saturation region. If excitation monitor 2014 determines $\dot{Q}_{HVAC}$ is in saturation, various adjustments can be made to $T_{sp}$ in order to help $\dot{Q}_{HVAC}$ get away from the saturation region.

A first situation that can arise during the learning period is that the temperature tracking error exceeds $e_{threshold}$ and that $\dot{Q}_{HVAC}$ is entirely within $R_{low}$ or $R_{high}$ for a period of time exceeding $$T_{Saturation_{NoControl}}.$$

In this case, $T_{sp}$ can be adjusted in a direction that helps $\dot{Q}_{HVAC}$ get away from the saturation region.

In some embodiments, the first situation has four cases that define how $T_{sp}$ is to be adjusted to drive $\dot{Q}_{HVAC}$ away from saturation conditions. First, if $\dot{Q}_{HVAC}$ is in a cooling mode and $\dot{Q}_{HVAC}$ is providing low cooling values that are within Rio, excitation monitor 2014 can be reduce $T_{sp}$ by 1 degree for the period of time defined by $T_{Override_{min}}$. Second, if $\dot{Q}_{HVAC}$ is in a cooling mode and $\dot{Q}_{HVAC}$ is providing high cooling values that are within $R_{high}$, excitation monitor 2014 can increase $T_{sp}$ by 1 degree for the period of time defined by $T_{Override_{min}}$. Third, if $\dot{Q}_{HVAC}$ is in a heating mode and is providing low cooling values that are within $R_{low}$, excitation monitor 2014 can increase $T_{sp}$ by 1 degree for the period of time defined by $T_{Override_{min}}$. Finally, if $\dot{Q}_{HVAC}$ is in a heating mode and is providing high cooling values that are within $R_{high}$, excitation monitor 2014 can reduce $T_{sp}$ by 1 degree for the period of time defined by $T_{Override_{min}}$. In the above explanations, 1 degree is used to adjust $T_{sp}$ purely for sake of example. $T_{sp}$ can be adjusted by any amount that can help drive $\dot{Q}_{HVAC}$ away from saturation. An illustrative example of the first situation is shown in greater detail below with reference to FIG. 23.

A second situation that can arise during the learning period is where $\dot{Q}_{HVAC}$ is entirely within $R_{low}$ or $R_{high}$ for a period of time that exceeds $T_{Saturation_{Control}}$. In the second situation, $T_{sp}$ may require adjustment whether or not the temperature tracking error exceeds $e_{threshold}$. In the second situation, to move $\dot{Q}_{HVAC}$ away from saturation, $T_{sp}$ can be adjusted (i.e., increased or decreased) in a direction that helps $\dot{Q}_{HVAC}$ get away from saturation regions. In some embodiments, adjustments to $T_{sp}$ in the second situation are the same as the adjustments described in the four cases of the first situation.

Increasing and decreasing $T_{sp}$ can happen repeatedly in both the first and second situations even if $T_{sp}$ moves outside bounds defined by $T_{Base_{min}}$ and $T_{Base_{max}}$. As described with reference to FIG. 21, $T_{Base_{min}}$ and $T_{Base_{max}}$ can act as soft constraints on values of $T_{sp}$, such that $T_{sp}$ can move beyond the range set by $T_{Base_{min}}$ and $T_{Base_{max}}$ if $\dot{Q}_{HVAC}$ is in a saturation region. However, excitation monitor 2014 determined values of $T_{sp}$ may be constrained to be within a range defined by $T_{Wide_{max}}$ and $T_{Wide_{min}}$. As described above, $T_{Wide_{max}}$ and $T_{Wide_{min}}$ can act as hard constraints on $T_{sp}$ such that $T_{sp}$ cannot take on a value greater than $T_{Wide_{max}}$ or less than $T_{Wide_{min}}$. As such, if excitation monitor 2014 calculates a value of $T_{sp}$ larger than $T_{Wide_{max}}$, $T_{sp}$ can be set to $T_{Wide_{max}}$. Likewise, if excitation monitor 2014 calculates a value of $T_{sp}$ less than $T_{Wide_{min}}$, $T_{sp}$ can be set to $T_{Wide_{min}}$. Maintaining values of $T_{sp}$ within $T_{Wide_{max}}$ and $T_{Wide_{min}}$ is shown in greater detail below with reference to FIG. 24.

If adjustments to $T_{sp}$ successfully move $\dot{Q}_{HVAC}$ out of a saturation region, excitation monitor 2014 can command $T_{sp}$ back to the base temperature excitation setpoint signal by incrementing or decrementing $T_{sp}$ by a set amount (e.g., 1 degree) until $T_{sp}$ reaches the base temperature excitation setpoint signal at that point. If $T_{sp}$ reaches the base temperature excitation setpoint signal, excitation monitor 2014 can again generate values of $T_{sp}$ based on the base temperature excitation setpoint signal until another change of $T_{sp}$ is required (e.g., $\dot{Q}_{HVAC}$ returns to saturation conditions) and/or the learning period concludes.

Graphs Illustrating Temperature Setpoint Adjustments for Persistent Excitations

Figure 22:
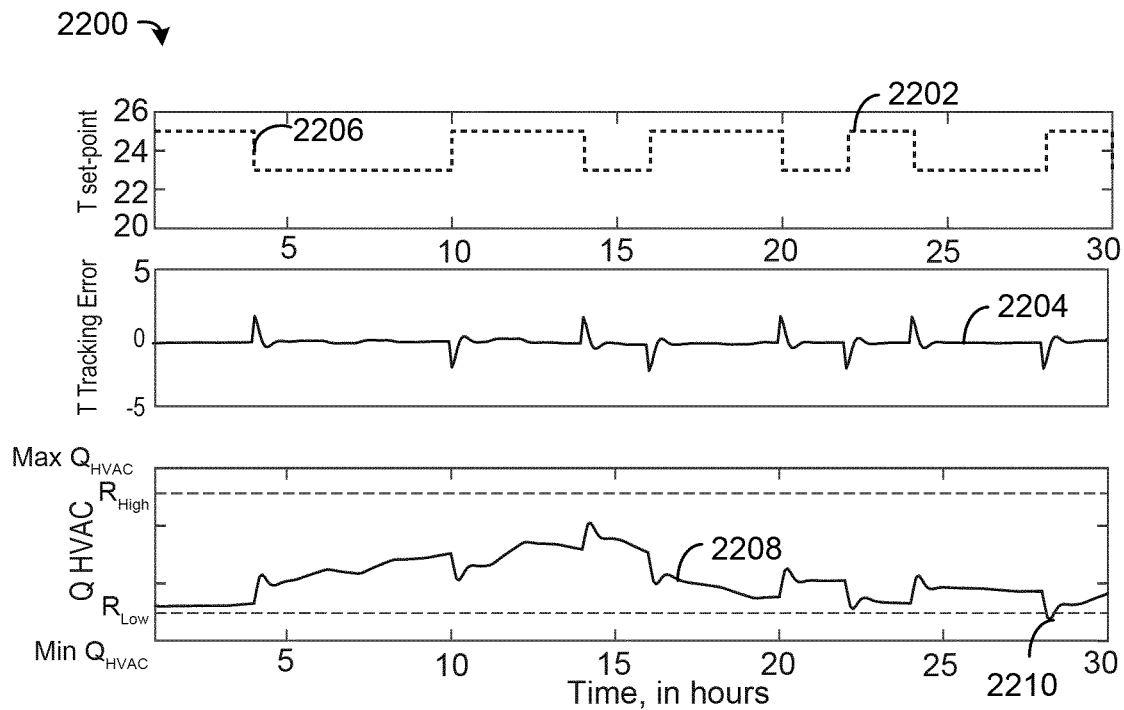
FIG. 22 is a graph illustrating effects of a pseudorandom binary signal on a temperature tracking error and a heat transfer value of an HVAC system, according to some embodiments.

Referring now to FIG. 22, a graph 2200 illustrating temperature setpoint adjustments under non-saturated conditions is shown, according to some embodiments. Graph 2200 is shown to include a series 2202. Series 2202 illustrates values of $T_{sp}$ generated based on the base temperature excitation setpoint signal determined by excitation monitor 2014.

Graph 2200 is also shown to include a series 2204 illustrating values of the temperature tracking error over time. As shown in series 2204, after each change in the temperature setpoint $T_{sp}$ indicated by series 2202, the temperature tracking error may temporarily fluctuate before returning to a value close to zero. For example, at a setpoint adjustment time 2206, the temperature tracking error indicated by series 2204 temporarily increases before returning close to zero. Advantageously, due to $T_{ignore}$, the period of time in which the temperature tracking error is ignored after a setpoint change, excitation monitor 2014 can ignore some and/or all of the fluctuation in series 2204 due to the setpoint adjustment at setpoint adjustment time 2206. In this way, $T_{ignore}$ prevents excitation monitor 2014 from determining an inaccurate correspondence between the temperature tracking error and $\dot{Q}_{HVAC}$ as indoor air temperature $T_{ia}$ can take an amount of time to adjust to the change in $T_{sp}$.

Graph 2200 is also shown to include a series 2208 illustrating values of $\dot{Q}_{HVAC}$ over time. As shown in graph 2200, series 2208 almost entirely remains outside of $R_{low}$ and $R_{high}$. While values of $\dot{Q}_{HVAC}$ are outside of $R_{low}$ and $R_{high}$, $\dot{Q}_{HVAC}$ can be determined to not be in a saturation region. However, series 2208 is shown to fall into a range defined by $R_{low}$ temporarily at point 2210. However, provided $T_{Saturation_{control}}$ is larger than a time duration values of $\dot{Q}_{HVAC}$ are within $R_{low}$, adjustments to $T_{sp}$ might not be necessary. As such, excitation monitor 2014 can continue determining values of series 2202 following the base temperature excitation setpoint signal.

Figure 23:
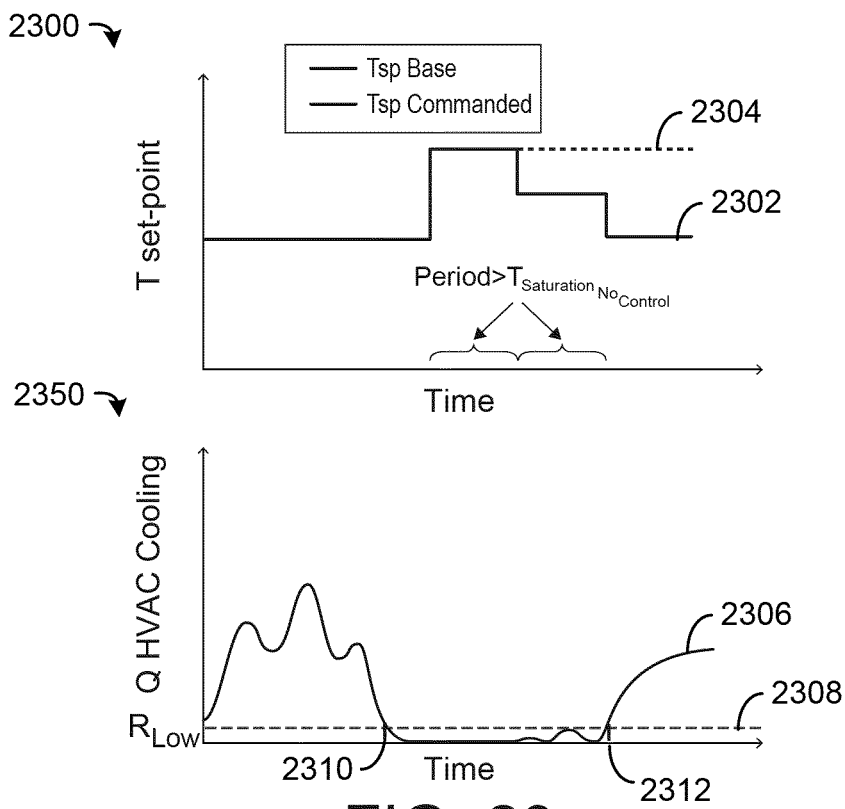
FIG. 23 is a pair of graphs illustrating how adjustments to a commanded setpoint affect values of $\dot{Q}_{HVAC}$, according to some embodiments.

Referring now to FIG. 23, a graph 2300 and a graph 2350 illustrating how adjustments to a commanded setpoint affect values of $\dot{Q}_{HVAC}$ are shown, according to some embodiments. Graph 2300 is shown to include a series 2302 and a series 2304. Series 2302 can represent commanded values of $T_{sp}$ over a time period. Series 2304 can represent values of $T_{sp}$ defined by the base temperature excitation setpoint signal determined by excitation monitor 2014. Graph 2350 is shown to include a series 2306 illustrating values of $\dot{Q}_{HVAC}$ over time. If values of series 2306 are greater than a saturation value 2308 defined by $R_{low}$, data rich in content can be generated. Likewise, as $\dot{Q}_{HVAC}$ is not in a saturation region, $T_{sp}$ (i.e., series 2302) can follow values defined by the base temperature excitation setpoint signal. However, beginning at a time 2310, values of series 2306 become equal to or below saturation value 2308 until a time 2312. As such, excitation monitor 2014 can adjust values of $T_{sp}$ in a direction to help $\dot{Q}_{HVAC}$ move away from saturation based on series 2306 moving below saturation value 2308. As described in greater detail above with reference to FIG. 20, excitation monitor 2014 may decrease values of $T_{sp}$ (e.g., by 1 degree) to move HVAC away from saturation since, as shown in FIG. 23, HVAC is in cooling mode and is providing low cooling values that are in $R_{low}$ starting at time 2310.

As shown by series 2302, the commanded values of $T_{sp}$ are decreased for each period of time greater than a predetermined value of $$T_{Saturation_{NoControl}}$$

to attempt to move $\dot{Q}_{HVAC}$ away from saturation. Due to adjustments to $T_{sp}$, $\dot{Q}_{HVAC}$ is shown to be driven out of saturation at time 2312. Therefore, as demonstrated by graphs 2300 and 2350, adjusting values of $T_{sp}$ can benefit results of the learning period by increasing an amount of useful training data gathered for use in system identification.

Figure 24:
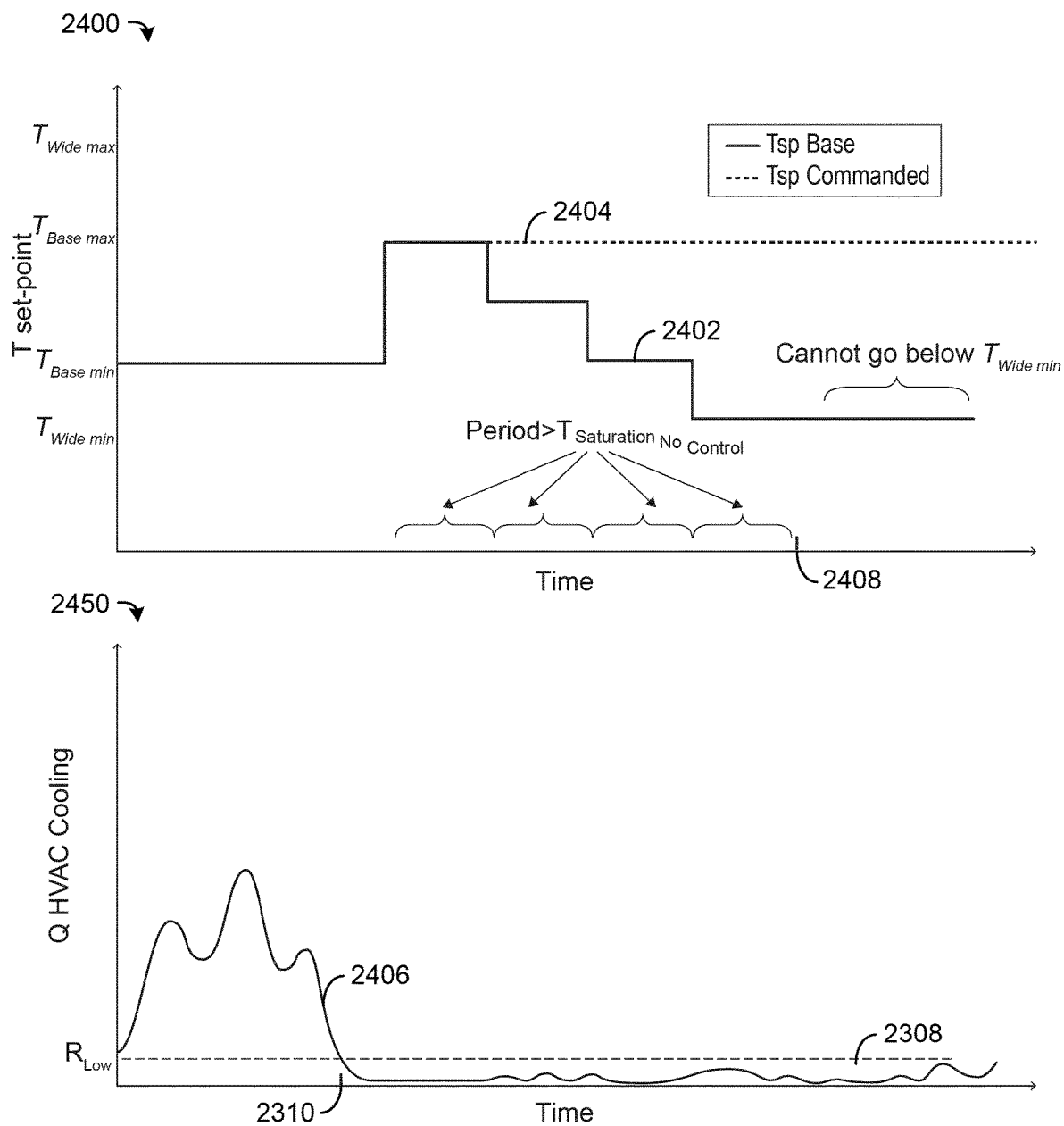
FIG. 24 is pair of a graphs illustrating constraints on adjustments to a commanded setpoint, according to some embodiments.

Referring now to FIG. 24, a graph 2400 and a graph 2450 illustrating constraints on adjustments to commanded setpoint are shown, according to some embodiments. In some embodiments, graph 2400 is similar to and/or the same as graph 2300 described with reference to FIG. 23. In some embodiments, graph 2450 is similar to and/or the same as graph 2350 as described with reference to FIG. 23. Graph 2400 is shown to include a series 2402 and a series 2404. In some embodiments, series 2402 and series 2404 are similar to and/or the same as series 2302 and series 2304 described with reference to FIG. 23. Particularly, series 2402 can represent commanded values of $T_{sp}$ over a time period and series 2404 can represent temperature setpoints defined by the base temperature excitation setpoint signal determined by excitation monitor 2014. Graph 2450 is shown to include a series 2406 illustrating values of $\dot{Q}_{HVAC}$ over time. In some embodiments, series 2406 is similar to and/or the same as 2306.

Graphs 2400 and 2450 can illustrate how constraints that are placed on an amount $T_{sp}$ can be adjusted to move $\dot{Q}_{HVAC}$ away from saturation. As shown in graph 2400, values of series 2402 decrease three times in an attempt to move $\dot{Q}_{HVAC}$ away from saturation. However, as shown by series 2406, adjustments to $T_{sp}$ as illustrated by series 2402 do not move $\dot{Q}_{HVAC}$ out of saturation as values of $\dot{Q}_{HVAC}$ stay below $R_{low}$ following time 2310. Following a third reduction of $T_{sp}$ illustrated by series 2402, excitation monitor 2014 may calculate a fourth reduction of $T_{sp}$ to be necessary to help $\dot{Q}_{HVAC}$ move out of saturation. However, even if the fourth reduction can help $\dot{Q}_{HVAC}$ move out of saturation, $T_{sp}$ cannot fall below $T_{Wide_{min}}$. As such, $T_{sp}$ is not adjusted at a time 2408 even though $\dot{Q}_{HVAC}$ is still in saturation and decrementing $T_{sp}$ may otherwise help move $\dot{Q}_{HVAC}$ out of saturation. In other words, due to the third adjustment of $T_{sp}$ resulting in $T_{sp}$ equaling $T_{Wide_{min}}$, $T_{sp}$ should not be decremented further regardless of whether HVAC remains in saturation. As illustrated in graph 2400, $T_{Wide_{min}}$ and $T_{Wide_{max}}$ can ensure that $T_{sp}$ is not incremented or decremented indefinitely by excitation monitor 2014 if $\dot{Q}_{HVAC}$ remains in saturation.

Figure 25:
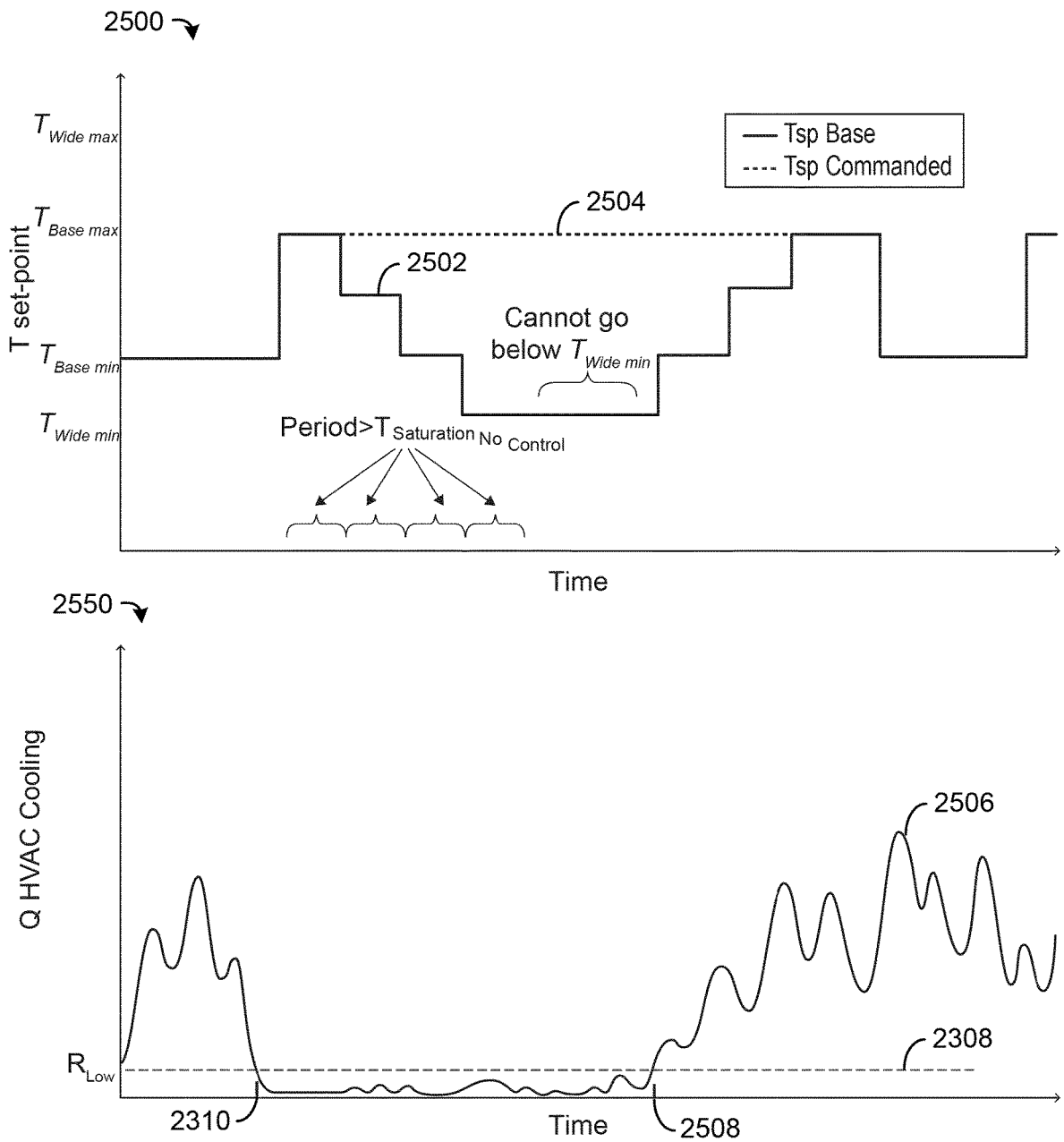
FIG. 25 is a pair of graphs illustrating how a commanded setpoint is returned to values of a base temperature excitation setpoint signal if values of $\dot{Q}_{HVAC}$ return to non-saturated values, according to some embodiments.

Referring now to FIG. 25, a graph 2500 and a graph 2550 illustrating how a commanded setpoint is returned to values of a base temperature excitation setpoint signal if values of $\dot{Q}_{HVAC}$ return to non-saturated values are shown, according to some embodiments. In some embodiments, graph 2500 is similar to and/or the same as graph 2400 described with reference to FIG. 24 and/or graph 2300 as described with reference to FIG. 23. In some embodiments, graph 2550 is similar to and/or the same as graph 2450 described with reference to FIG. 24 and/or graph 2350 as described with reference to FIG. 23. Graph 2500 is shown to include a series 2502 and a series 2504. In some embodiments, series 2502 and series 2504 are similar to and/or the same as series 2402 and series 2404 described with reference to FIG. 24. Particularly, series 2502 can represent commanded values of $T_{sp}$ over a time period and series 2504 can represent values of $T_{sp}$ defined by the base temperature excitation setpoint signal determined by excitation monitor 2014. Graph 2550 is shown to include a series 2506 illustrating values of $\dot{Q}_{HVAC}$ over time. In some embodiments, series 2506 is similar to and/or the same as series 2406.

At a time 2508, values of $\dot{Q}_{HVAC}$ as shown by series 2506 move out a saturation region shown by saturation value 2308. Based on a determination that values of $\dot{Q}_{HVAC}$ are out of the saturation region, excitation monitor 2014 can adjust commanded values of $T_{sp}$ back to values defined by the base temperature excitation setpoint signal. To return $T_{sp}$ to base values, excitation monitor 2014 is shown to increment (e.g., by 1 degree) $T_{sp}$ until series 2502 is equal to series 2504. If series 2502 and series 2504 are equal, commanded values of $T_{sp}$ can follow the base temperature excitation setpoint signal until adjustments to $T_{sp}$ are necessary (e.g., $\dot{Q}_{HVAC}$ returns to saturation conditions) and/or until the learning period concludes.

Process for Persistent Excitation of HVAC Dynamics

Figure 26:
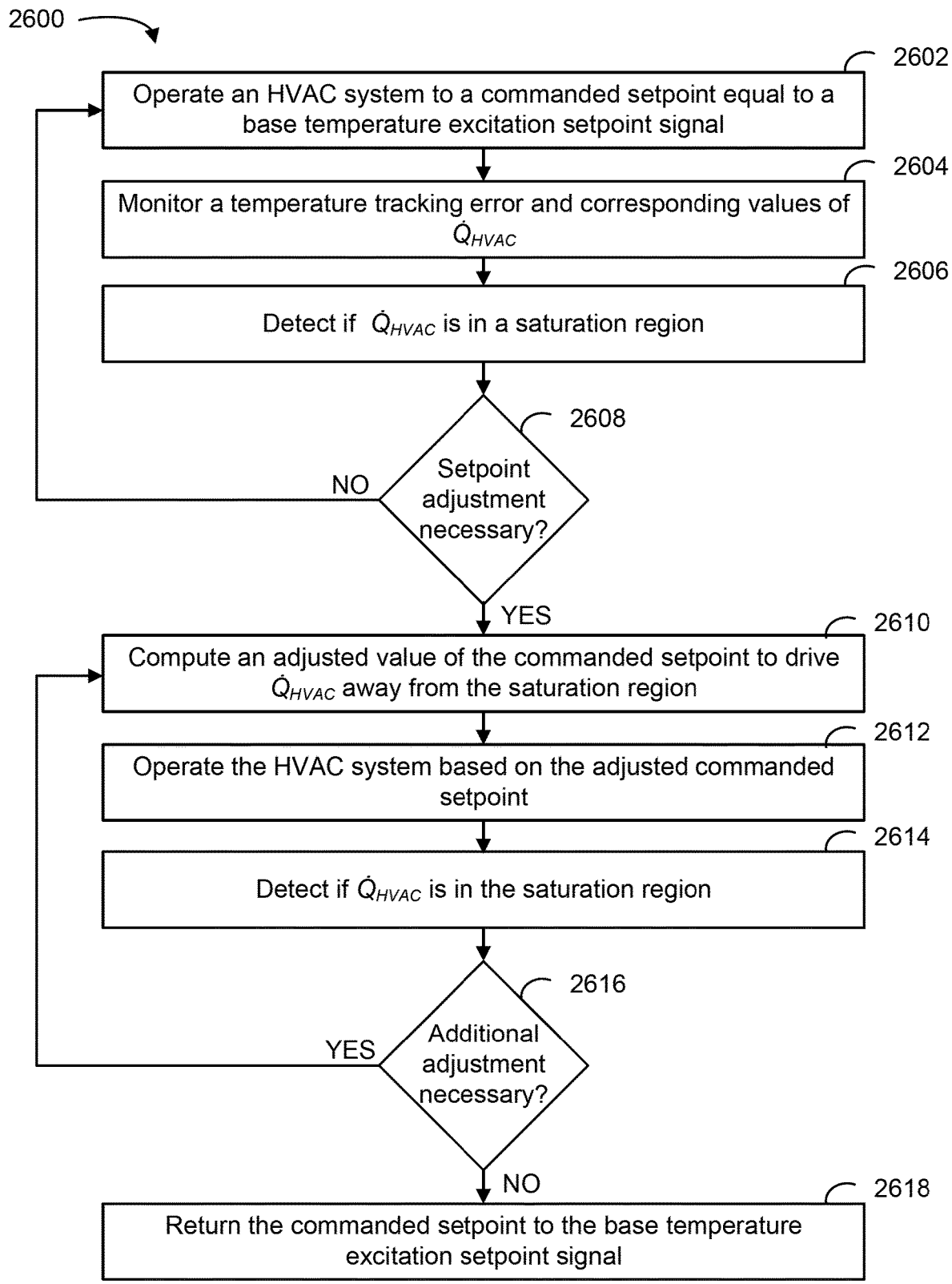
FIG. 26 is a flow diagram of a process for adjusting a commanded setpoint for persistent excitation of an HVAC system, according to some embodiments.

Referring now to FIG. 26, a process 2600 for adjusting a commanded setpoint for persistent excitation of an HVAC system is shown, according to some embodiments. Process 2600 can allow for content-rich data to be gathered for use in a system identification process. Actuator saturation can result in inaccurate mappings between the commanded setpoint and corresponding values of $\dot{Q}_{HVAC}$ and/or can result in a training data set that does not capture a large variety of $\dot{Q}_{HVAC}$ values that excite all critical system dynamics. As such, process 2600 can help reduce a total amount of time $\dot{Q}_{HVAC}$ spends in saturation regions during a learning period to improve quality of the training data used in system identification. Throughout some and/or all steps of process 2600 (i.e., throughout the learning period), training data can be gathered for subsequent use in system identification. In some embodiments, some and/or all steps of process 2600 are performed by system excitation controller 1900.

Process 2600 is shown to include operating an HVAC system to a commanded setpoint equal to a base temperature excitation setpoint signal (step 2602). The base temperature excitation setpoint signal can be a PRBS, an RGS, and/or another type of signal. The base excitation setpoint signal can ensure that the commanded setpoint takes on different values over the learning period can gather a variety of training data. In some embodiments, step 2602 is performed by excitation monitor 2014.

Process 2600 is shown to include monitoring a temperature tracking error and corresponding values of $\dot{Q}_{HVAC}$ (step 2604). The temperature tracking error can be defined as a difference between the commanded septoint $T_{sp}$ and an indoor air temperature $T_{ia}$. $T_{sp}$ and $T_{ia}$ can be determined for a zone of a building and/or any space of the building. For each value of the temperature tracking error, a corresponding value of $\dot{Q}_{HVAC}$ can be determined. In some embodiments, step 2604 is performed by data collector 2010 and/or excitation monitor 2014.

Process 2600 is shown to include detecting if $\dot{Q}_{HVAC}$ is in a saturation region (step 2606). To detect if $\dot{Q}_{HVAC}$ is in saturation, step 2606 may include determining if the temperature tracking error exceeds a threshold value $e_{threshold}$ and if $\dot{Q}_{HVAC}$ is entirely within predetermined values of $R_{low}$ or $R_{high}$ for a period of time that exceeds a predetermined value of $$T_{Saturation_{NoControl}}.$$

Alternatively, $\dot{Q}_{HVAC}$ may be determined to be in saturation if $\dot{Q}_{HVAC}$ is entirely within $R_{low}$ or $R_{high}$ for a period of time that exceeds $T_{Saturation_{Control}}$, regardless of whether the temperature tracking error exceeds $e_{threshold}$. However, if the commanded setpoint has recently adjusted (e.g., due to a change in the base temperature excitation setpoint signal), the temperature tracking error can be ignored for a time period after the change as defined by $T_{ignore}$. In some embodiments, $e_{threshold}$ is a time varying value (i.e., $e_{threshold}(t)$) such that the temperature tracking error can be constrained by different values over time. In some embodiments, step 2606 is performed by excitation monitor 2014.

Process 2600 is shown to include a determination of whether a setpoint adjustment is necessary (step 2608). Adjusting the commanded setpoint can help $\dot{Q}_{HVAC}$ move away from the saturation region. As such, the determination made in step 2608 can be based on whether HVAC is detected to be in saturation in step 2606. If the setpoint adjustment is determined not to be necessary in step 2608 ("NO"), process 2600 can return to step 2602. If a setpoint adjustment is determined to be necessary in step 2608 ("YES"), process 2600 can continue to step 2610. In some embodiments, step 2608 is performed by excitation monitor 2014.

Process 2600 is shown to include computing an adjusted value of the commanded setpoint to drive $\dot{Q}_{HVAC}$ away from the saturation region (step 2610). If the temperature tracking error exceeds $e_{threshold}$ and $\dot{Q}_{HVAC}$ is entirely within $R_{low}$ or $R_{high}$ for a period of time that exceeds $T_{Saturation_{NoControl}}$, four actions can be taken depending on $\dot{Q}_{HVAC}$. First, if $\dot{Q}_{HVAC}$ is in cooling mode and is providing low cooling values within $R_{low}$, the commanded setpoint can be reduced by 1 degree for a period of time $T_{override_{min}}$. Second, if $\dot{Q}_{HVAC}$ is in cooling mode and is providing high cooling values within $R_{high}$, the commanded setpoint can be increased by 1 degree for $T_{override_{min}}$. Third, if $\dot{Q}_{HVAC}$ is in heating mode and is providing low cooling values within $R_{low}$, the commanded setpoint can be increased by 1 degree for $T_{override_{min}}$. Fourth, if $\dot{Q}_{HVAC}$ is in heating mode and is providing high cooling values within $R_{high}$, the commanded setpoint can be reduced by 1 degree for $T_{override_{min}}$. 1 degree is used purely for sake of example and that the commanded setpoint can be adjusted by any amount appropriate for helping to move $\dot{Q}_{HVAC}$ out of saturation.

Alternatively, if $\dot{Q}_{HVAC}$ is entirely within $R_{low}$ or $R_{high}$ for a period that exceeds a predetermined value of $T_{Saturation_{Control}}$, the commanded setpoint can be adjusted in a direction that helps $\dot{Q}_{HVAC}$ move away from saturation region. If $\dot{Q}_{HVAC}$ is entirely within $R_{low}$ or $R_{high}$ for a period that exceeds a predetermined value of $T_{Saturation_{Control}}$, the commanded setpoint can be adjusted similar to and/or the same as the four actions above. In any situation, a value of the commanded setpoint should not exceed a predetermined value of $T_{Wide_{max}}$ or fall below a predetermined value of $T_{Wide_{min}}$. In some embodiments, $T_{Wide_{max}}$ and/or $T_{Wide_{min}}$ are time varying such that the commanded setpoint may be restricted to different values over time. $T_{Wide_{max}}$ and/or $T_{Wide_{min}}$ may be time varying if, for example, occupants demand a space governed by the HVAC system to be comfortable at certain times (e.g., during a workday). In some embodiments, step 2610 is performed by excitation monitor 2014.

Process 2600 is shown to include operating the HVAC system based on the adjusted commanded setpoint (step 2612). The adjusted commanded setpoint can be provided to HVAC equipment of the HVAC system to affect a change on a variable state or condition of a zone (or another space) of a building. Based on the adjusted commanded setpoint, the HVAC equipment may operate such that, for example, the indoor air temperature changes, different values of $\dot{Q}_{HVAC}$ can be generated, etc. In some embodiments, step 2612 is performed by excitation monitor 2014.

Process 2600 is shown to include detecting if $\dot{Q}_{HVAC}$ is in the saturation region (step 2614). In some embodiments, step 2614 is similar to and/or the same as step 2606. In some embodiments, operating the HVAC system based on the adjusted commanded setpoint is sufficient to move $\dot{Q}_{HVAC}$ out of saturation. In some embodiments, however, additional adjustments to the commanded setpoint are necessary to move $\dot{Q}_{HVAC}$ out of saturation. In some embodiments, step 2614 is performed by excitation monitor 2014.

Process 2600 is shown to include a determination of whether an additional adjustment to the commanded setpoint is necessary (step 2616). The determination made in step 2616 can be based on whether $\dot{Q}_{HVAC}$ is detected to be in saturation at step 2614. If the additional adjustment to the commanded setpoint is determined to be necessary in step 2616 ("YES"), process 2600 can return to step 2610. If the additional adjustment to the commanded setpoint is determined to not be necessary in step 2616 ("NO"), process 2600 can continue to step 2618. In some embodiments, step 2616 is performed by excitation monitor 2014.

Process 2600 is shown to include returning the commanded setpoint to the base temperature excitation setpoint signal (step 2618). In step 2618, $\dot{Q}_{HVAC}$ should be outside saturation regions. As such, the commanded setpoint can be transitioned back to the base temperature excitation setpoint signal. To accomplish said transition, the commanded setpoint can be incremented or decremented by a set amount (e.g., 1 degree) until the commanded setpoint matches the base temperature excitation setpoint signal. If the commanded setpoint reaches the base temperature excitation setpoint signal, the commanded setpoint can follow the base temperature excitation setpoint signal as in step 2602 until either another setpoint adjustment is necessary (in which case process 2600 may repeat), or until the learning period is concluded. In some embodiments, step 2618 is performed by excitation monitor 2014.

Process 2600 can thereby be repeated over a learning period to generate and collect content-rich training data. Such content-rich training data can then be used in a system identification process to identify a predictive thermal model for the system, which may generate highly accurate predictions as compared to models trained on data obtained without the advantages of process 2600. The predictive model identified using the content-rich training data resulting from process 2600 can then be used to control the HVAC equipment 210 in a model predictive control approach or other control approach. Because the training data is content-rich and the resulting model is highly accurate, the resulting model predictive control approach may provide substantial improvements in energy efficiency and occupant comfort as well as significant reductions in the cost of operating building equipment.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. An environmental control system for a building, the system comprising:
   heating, ventilation, or air conditioning (HVAC) equipment that operates to affect a temperature of a zone of the building;
   a temperature sensor to measure the temperature of the zone; and
   a controller comprising a processing circuit configured to:
      operate the HVAC equipment based on a temperature setpoint;
      gather training data indicating the temperature of the zone and the temperature setpoint;
      monitor a temperature tracking error of the zone and a heat transfer value of the HVAC equipment, the temperature tracking error based on the training data;
      determine if the HVAC equipment is in a saturation region based on the temperature tracking error and the heat transfer value;
      in response to a determination that the HVAC equipment is in the saturation region, calculate an adjusted temperature setpoint; and
      operate the HVAC equipment based on the adjusted temperature setpoint.

2. The system of claim 1, wherein the processing circuit is configured to:
   in response to operating the HVAC equipment based on the adjusted temperature setpoint, determine if an additional setpoint adjustment is necessary to drive the HVAC equipment out of the saturation region; and
   in response to a determination that the additional setpoint adjustment is necessary, calculate a new value of the adjusted temperature setpoint and operate the HVAC equipment based on the new value of the adjusted temperature setpoint.

3. The system of claim 1, wherein the system comprises a user interface, wherein the processing circuit is configured to:
   receive a temperature adjustment from the user interface; and
   determine a temperature constraint based on the temperature adjustment, wherein the temperature setpoint adheres to the temperature constraint.

4. The system of claim 1, wherein the processing circuit is configured to:
   generate a predictive model based on the training data to predict one or more system dynamics; and
   perform an optimization based on the predictive model to determine an operating setpoint of the HVAC equipment.

5. The system of claim 1, wherein the training data indicate one or more system dynamics comprising at least one of:
   temperature dynamics of the zone;
   building mass temperature dynamics of the building; or
   heat transfer dynamics of the HVAC equipment.

6. The system of claim 1, wherein the processing circuit is configured to determine if the HVAC equipment is in the saturation region by:
   determining whether the temperature tracking error exceeds a threshold value for a predetermined period of time; and
   determining whether the HVAC equipment is operating in a low range around a minimum load or is operating in a high range around a maximum load for the predetermined period of time.

7. The system of claim 1, wherein the temperature setpoint is determined based on a pseudorandom binary signal or a random Gaussian signal.

8. A method for exciting system dynamics of a building, the method comprising:
   operating heating, ventilation, or air conditioning (HVAC) equipment based on a temperature setpoint to affect a temperature of a zone of the building;
   gathering training data indicating the temperature of the zone and the temperature setpoint;
   monitoring a temperature tracking error of the zone and a heat transfer value of the HVAC equipment, the temperature tracking error based on the training data;
   determining if the HVAC equipment is in a saturation region based on the temperature tracking error and the heat transfer value;
   in response to a determination that the HVAC equipment is in the saturation region, calculating an adjusted temperature setpoint; and
   operating the HVAC equipment based on the adjusted temperature setpoint.

9. The method of claim 8, further comprising:
   in response to operating the HVAC equipment based on the adjusted temperature setpoint, determining if an additional setpoint adjustment is necessary to drive the HVAC equipment out of the saturation region; and
   in response to a determination that the additional setpoint adjustment is necessary, calculating a new value of the adjusted temperature setpoint and operate the HVAC equipment based on the new value of the adjusted temperature setpoint.

10. The method of claim 8, further comprising:
    receiving a temperature adjustment; and
    determining a temperature constraint based on the temperature adjustment, wherein the temperature setpoint adheres to the temperature constraint.

11. The method of claim 8, further comprising:
    generating a predictive model based on the training data to predict one or more system dynamics; and
    performing an optimization based on the predictive model to determine an operating setpoint of the HVAC equipment.

12. The method of claim 8, wherein the training data indicate one or more system dynamics comprising at least one of:
    temperature dynamics of the zone;
    building mass temperature dynamics of the building; or
    heat transfer dynamics of the HVAC equipment.

13. The method of claim 8, wherein determining if the HVAC equipment is in the saturation region comprises:
    determining whether the temperature tracking error exceeds a threshold value for a predetermined period of time; and
    determining whether the HVAC equipment is operating in a low range around a minimum load or is operating in a high range around a maximum load for the predetermined period of time.

14. A controller for operating for operating heating, ventilation, or air conditioning (HVAC) equipment of a building, the controller comprising:
    one or more processors; and
    one or more non-transitory computer-readable media storing instructions that, when executed by the one or more processors, cause the one or more processors to perform operations comprising:
       operating the HVAC equipment based on a temperature setpoint to affect a temperature of a zone of the building;
       gathering training data indicating the temperature of the zone and the temperature setpoint;
       monitoring a temperature tracking error of the zone and a heat transfer value of the HVAC equipment, the temperature tracking error based on the training data;
       determining if the HVAC equipment is in a saturation region based on the temperature tracking error and the heat transfer value;
       in response to a determination that the HVAC equipment is in the saturation region, calculating an adjusted temperature setpoint; and
       operating the HVAC equipment based on the adjusted temperature setpoint.

15. The controller of claim 14, wherein the operations comprise:
    in response to operating the HVAC equipment based on the adjusted temperature setpoint, determining if an additional setpoint adjustment is necessary to drive the HVAC equipment out of the saturation region; and
    in response to a determination that the additional setpoint adjustment is necessary, calculating a new value of the adjusted temperature setpoint and operate the HVAC equipment based on the new value of the adjusted temperature setpoint.

16. The controller of claim 14, wherein the operations comprise:
    receiving a temperature adjustment; and
    determining a temperature constraint based on the temperature adjustment, wherein the temperature setpoint adheres to the temperature constraint.

17. The controller of claim 14, wherein the operations comprise:
    generating a predictive model based on the training data to predict one or more system dynamics; and
    performing an optimization based on the predictive model to determine an operating setpoint of the HVAC equipment.

18. The controller of claim 14, wherein the training data indicate one or more system dynamics comprising at least one of:
    temperature dynamics of the zone;
    building mass temperature dynamics of the building; or
    heat transfer dynamics of the HVAC equipment.

19. The controller of claim 14, wherein determining if the HVAC equipment is in the saturation region comprises:
    determining whether the temperature tracking error exceeds a threshold value for a predetermined period of time; and determining whether the HVAC equipment is operating in a low range around a minimum load or is operating in a high range around a maximum load for the predetermined period of time.

20. The controller of claim 14, wherein the temperature setpoint is determined based on a pseudorandom binary signal or a random Gaussian signal.

* * * * *